(12) United States Patent
Greco et al.

(10) Patent No.: US 12,334,038 B2
(45) Date of Patent: *Jun. 17, 2025

(54) SYSTEMS AND TECHNIQUES FOR AGGREGATION, DISPLAY, AND SHARING OF DATA

(71) Applicant: Synthro Inc., Bellingham, WA (US)

(72) Inventors: Michael A. Greco, Bellingham, WA (US); Michael J. Pulaski, Jr., Paris (FR); Patrick J. Bradley, Atlanta, GA (US); Alexandre Chailleux, Val de Chaise (FR); Steven D. Phelps, Tigard, OR (US); Ronald Allen Matsumoto, Bellingham, WA (US); David J. Pacini, Larkspur, CA (US); Luc A. Heinrich, Paris (FR)

(73) Assignee: Synthro Inc., Bellingham, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,914

(22) Filed: Aug. 29, 2023

(65) Prior Publication Data

US 2024/0203379 A1 Jun. 20, 2024

Related U.S. Application Data

(63) Continuation of application No. 17/498,624, filed on Oct. 11, 2021, now Pat. No. 11,776,506, which is a
(Continued)

(51) Int. Cl.
*G09G 5/34* (2006.01)
*G06F 3/04817* (2022.01)
(Continued)

(52) U.S. Cl.
CPC ........... *G09G 5/34* (2013.01); *G06F 3/04817* (2013.01); *G06F 3/0482* (2013.01);
(Continued)

(58) Field of Classification Search
CPC ............... G06F 3/04817; G06F 3/0482; G06F 3/0485–04855
See application file for complete search history.

(56) References Cited

U.S. PATENT DOCUMENTS 6,055,495 A    4/2000   Tucker et al.
D499,739 S    12/2004   Mansour et al.
(Continued)

OTHER PUBLICATIONS

Dipity—Create a free digital timeline. Available at http://sign-in.at/documentation/dipity. Oct. 12, 2015. 3 pages. Last accessed on Mar. 30, 2017.
(Continued)

*Primary Examiner* — Charles Tseng
(74) *Attorney, Agent, or Firm* — Andrew J. Tibbetts; Samuel S. Stone; Greenberg Traurig, LLC

(57) ABSTRACT

Systems and techniques for aggregation, display, and sharing of data. Graphic items representing data objects identified by a data package may be displayed on timelines. Each timeline may be associated with a respective class of data, and each graphic item displayed on a respective timeline may represent one or more of the data objects in the class associated with the respective timeline. A prediction may be made regarding which data will be displayed in the near future. A pre-fetch request may be generated, and the predicted data may be retrieved from a remote server and stored in a local data cache before the user requests that the predicted data be displayed.

19 Claims, 24 Drawing Sheets

Related U.S. Application Data continuation of application No. 16/688,379, filed on Nov. 19, 2019, now Pat. No. 11,145,275, which is a continuation of application No. 15/256,606, filed on Sep. 4, 2016, now Pat. No. 10,522,112, which is a continuation of application No. 15/256,564, filed on Sep. 3, 2016, now Pat. No. 10,410,604.

(60) Provisional application No. 62/214,077, filed on Sep. 3, 2015.

(51) Int. Cl.
*G06F 3/0482* (2013.01)
*G06F 3/04845* (2022.01)
*G06F 3/0485* (2022.01)
*G06F 16/9535* (2019.01)
*G06F 16/957* (2019.01)
*G06Q 10/0631* (2023.01)
*G06Q 50/00* (2012.01)
*H04L 67/5681* (2022.01)
*G06F 12/0862* (2016.01)
*G06F 12/0868* (2016.01)
*H04L 51/52* (2022.01)

(52) U.S. Cl.
CPC ........ *G06F 3/04845* (2013.01); *G06F 3/0485* (2013.01); *G06F 16/9535* (2019.01); *G06F 16/9577* (2019.01); *G06Q 10/06314* (2013.01); *G06Q 50/01* (2013.01); *H04L 67/5681* (2022.05); *G06F 12/0862* (2013.01); *G06F 12/0868* (2013.01); *G06F 2203/04806* (2013.01); *G06F 2212/465* (2013.01); *G06F 2212/6024* (2013.01); *G09G 2340/045* (2013.01); *G09G 2340/0464* (2013.01); *G09G 2354/00* (2013.01); *G09G 2370/022* (2013.01); *H04L 51/52* (2022.05)

(56) References Cited

U.S. PATENT DOCUMENTS

| | | |
|---|---|---|
| D499,740 S | 12/2004 | Ombao et al. |
| 6,950,989 B2 | 9/2005 | Rosenzweig et al. |
| D585,455 S | 1/2009 | Byeon |
| D593,574 S | 6/2009 | Guimaraes et al. |
| D621,850 S | 8/2010 | Tarara et al. |
| D641,372 S | 7/2011 | Gardner et al. |
| D643,438 S | 8/2011 | Gardner et al. |
| 8,381,126 B2 | 2/2013 | Gould |
| D677,680 S | 3/2013 | Edwards et al. |
| D683,750 S | 6/2013 | Hally |
| D689,874 S | 9/2013 | Brinda et al. |
| D695,783 S | 12/2013 | Edwards et al. |
| D696,283 S | 12/2013 | Schwengler et al. |
| D696,285 S | 12/2013 | Hally |
| D701,223 S | 3/2014 | Cho |
| D701,519 S | 3/2014 | Campiranon et al. |
| D707,245 S | 6/2014 | Bruck et al. |
| D712,920 S | 9/2014 | Sloo et al. |
| D719,581 S | 12/2014 | Frew et al. |
| D719,969 S | 12/2014 | Ebtekar et al. |
| D725,142 S | 3/2015 | Park et al. |
| D727,925 S | 4/2015 | Talbot |
| D727,948 S | 4/2015 | Milliotte et al. |
| D727,949 S | 4/2015 | Milliotte et al. |
| D730,378 S | 5/2015 | Xiong et al. |
| D730,379 S | 5/2015 | Xiong et al. |
| D732,051 S | 6/2015 | Jeong et al. |
| D732,567 S | 6/2015 | Moon et al. |
| D733,745 S | 7/2015 | Huang |
| D734,351 S | 7/2015 | Chae et al. |
| D734,356 S | 7/2015 | Xiong et al. |
| D736,792 S | 8/2015 | Brinda et al. |
| 9,131,192 B2 | 9/2015 | Ubillos et al. |
| D740,849 S | 10/2015 | Zou |
| D741,355 S | 10/2015 | Zou |
| D746,852 S | 1/2016 | Zhou |
| D746,856 S | 1/2016 | Jiang et al. |
| D749,117 S | 2/2016 | Huang |
| 9,298,196 B2 | 3/2016 | Matsuoka et al. |
| D753,175 S | 4/2016 | Qu |
| D753,670 S | 4/2016 | Tian |
| D754,181 S | 4/2016 | Dong et al. |
| D754,710 S | 4/2016 | Dong et al. |
| D754,713 S | 4/2016 | Zhang et al. |
| D754,714 S | 4/2016 | Zhang et al. |
| D755,219 S | 5/2016 | Kim |
| D755,223 S | 5/2016 | Liu et al. |
| D757,758 S | 5/2016 | Kim |
| D757,791 S | 5/2016 | van Os |
| D758,445 S | 6/2016 | Chang et al. |
| D759,689 S | 6/2016 | Olson et al. |
| D760,256 S | 6/2016 | Olson et al. |
| D760,793 S | 7/2016 | Liang et al. |
| D762,687 S | 8/2016 | Campiranon et al. |
| D765,100 S | 8/2016 | Kim et al. |
| D765,672 S | 9/2016 | Raff et al. |
| D768,154 S | 10/2016 | Kim et al. |
| D769,303 S | 10/2016 | Rodriguez |
| D770,480 S | 11/2016 | Wielgosz |
| D776,713 S | 1/2017 | Small et al. |
| D781,302 S | 3/2017 | Baguley et al. |
| D781,318 S | 3/2017 | Kisielius et al. |
| D781,905 S | 3/2017 | Nakaguchi et al. |
| D781,909 S | 3/2017 | Capela et al. |
| D782,495 S | 3/2017 | Laska et al. |
| D783,031 S | 4/2017 | Kim et al. |
| D786,298 S | 5/2017 | Huang |
| D789,377 S | 6/2017 | Vazquez |
| D789,982 S | 6/2017 | Christiana et al. |
| D791,811 S | 7/2017 | Kisielius et al. |
| D797,781 S | 9/2017 | Ochocinski et al. |
| D799,506 S | 10/2017 | Chaudhri et al. |
| D802,607 S | 11/2017 | Apodaca et al. |
| D803,845 S | 11/2017 | Arora |
| D808,411 S | 1/2018 | Lowell et al. |
| D808,990 S | 1/2018 | Ayvazian et al. |
| D809,531 S | 2/2018 | Ayvazian et al. |
| D809,545 S | 2/2018 | Ban et al. |
| 9,890,970 B2 | 2/2018 | Bruck et al. |
| D812,636 S | 3/2018 | Lim et al. |
| D813,894 S | 3/2018 | Lowell et al. |
| 9,972,121 B2 | 5/2018 | Li et al. |
| D823,335 S | 7/2018 | Alonso Ruiz et al. |
| D824,947 S | 8/2018 | Wu et al. |
| D824,948 S | 8/2018 | Wu et al. |
| D829,239 S | 9/2018 | Rehman |
| D841,017 S | 2/2019 | Bathla |
| D847,163 S | 4/2019 | Matsumura |
| D847,167 S | 4/2019 | Jann et al. |
| D848,454 S | 5/2019 | Kim et al. |
| D852,208 S | 6/2019 | Bathla |
| D857,706 S | 8/2019 | Chen et al. |
| D860,225 S | 9/2019 | Naimark et al. |
| 10,410,604 B2 | 9/2019 | Greco et al. |
| 10,522,112 B2 | 12/2019 | Greco et al. |
| 11,145,275 B2 | 10/2021 | Greco et al. |
| 2003/0147361 A1 | 8/2003 | Tsukidate et al. |
| 2003/0167202 A1 | 9/2003 | Marks et al. |
| 2005/0251747 A1 | 11/2005 | Dolling et al. |
| 2005/0289482 A1 | 12/2005 | Anthony et al. |
| 2007/0171224 A1 | 7/2007 | MacPherson |
| 2008/0294663 A1 | 11/2008 | Heinley et al. |
| 2009/0216806 A1 | 8/2009 | Feuerstein et al. |
| 2009/0235347 A1 | 9/2009 | Syed et al. |
| 2010/0023851 A1 | 1/2010 | Schormann |
| 2011/0010623 A1 | 1/2011 | Vanslette et al. |
| 2011/0202866 A1 | 8/2011 | Huang et al. |
| 2011/0239149 A1 | 9/2011 | Lazo et al. |
| 2012/0166971 A1 | 6/2012 | Sachson et al. |
| 2013/0067420 A1 | 3/2013 | Pittappilly et al. |

(56) References Cited

U.S. PATENT DOCUMENTS

| | | |
|---|---|---|
| 2013/0239057 A1 | 9/2013 | Ubillos et al. |
| 2013/0339868 A1 | 12/2013 | Sharpe et al. |
| 2014/0310623 A1 | 10/2014 | O'Connell, Jr. et al. |
| 2015/0088679 A1 | 3/2015 | Votaw et al. |
| 2015/0156188 A1 | 6/2015 | Wang et al. |
| 2015/0160834 A1 | 6/2015 | Lee et al. |
| 2015/0234663 A1 | 8/2015 | Chishti et al. |
| 2016/0012424 A1 | 1/2016 | Simon et al. |
| 2016/0057317 A1 | 2/2016 | Zhao et al. |
| 2016/0313876 A1 | 10/2016 | Dong et al. |
| 2017/0063912 A1 | 3/2017 | Muddu et al. |
| 2022/0277708 A1 | 9/2022 | Greco et al. |

OTHER PUBLICATIONS

International Search Report and Written Opinion for International Application No. PCT/US2016/050308 dated Feb. 24, 2017 (19 pages).

"How to Use Google's Calendar App on Android" Apr. 11, 2012, YouTube, site visited Mar. 1, 2019: https://www.youtube.com/watch?v=n FuCXo80X6Y; (1 page).

"Create a Horizontal Scrolling Table" Feb. 18, 2013, YouTube, site visited Mar. 1, 2019: https://www.youtube.com/watch?v=81_iApG54sU; (1 page).

EP Communication—Article 94(3) Search Report, from EP 16778914.8, dated Jul. 15, 2019, 6 pages.

EP Communication—Rule 115(1) Oral Proceedings, from EP 16778914.8, dated Apr. 23, 2020, 8 pages.

Examination Search Report from CA 2996973, dated Dec. 1, 2022, 4 pages.

Examination Search Report from AU 2016316125, dated Jun. 30, 2021, 6 pages.

"Making Easy, Accurate Timelines in Adobe Illustrator (Plus Styling)" Mar. 7, 2016, YouTube, site visited Nov. 30, 2020: https://www.youtube.com/watch?v=pYYf4-Eqho8 (Year: 2016).

"Editing clips to a Premiere Elements timeline I lynda.com tutorial" Apr. 20, 2012, YouTube, site visited Nov. 30, 2020: https://www.youtube.com/watch?v=cgct9pRIFNs (Year: 2012).

Timmer, Eric, "iMovie Tutorial—Customizing the Video Timeline Tutorial" Jun. 7, 2016, YouTube, site visited Nov. 30, 2020: https://www. <http://www.youtube.com/watch?v=-4dqU6_P7vU>youtube.com/watch?v=-4dqU6_P7vU (Year: 2016).

SYSTEMS AND TECHNIQUES FOR AGGREGATION, DISPLAY, AND SHARING OF DATA

CROSS-REFERENCE TO RELATED APPLICATION

This application is a continuation of U.S. patent application Ser. No. 17/498,624, titled "SYSTEMS AND TECHNIQUES FOR AGGREGATION, DISPLAY, AND SHARING OF DATA" and filed on Oct. 11, 2021, which is a continuation of U.S. patent application Ser. No. 16/688,379, titled "SYSTEMS AND TECHNIQUES FOR AGGREGATION, DISPLAY, AND SHARING OF DATA" and filed on Nov. 19, 2019, now U.S. Pat. No. 11,145,275, issued Oct. 12, 2021, which is a continuation of U.S. patent application Ser. No. 15/256,606, titled "SYSTEMS AND TECHNIQUES FOR AGGREGATION, DISPLAY, AND SHARING OF DATA" and filed on Sep. 4, 2016 (now U.S. Pat. No. 10,522,112, issued Dec. 31, 2019), which is a continuation of U.S. patent application Ser. No. 15/256,564, titled "SYSTEMS AND TECHNIQUES FOR AGGREGATION, DISPLAY, AND SHARING OF DATA" and filed on Sep. 3, 2016 (now U.S. Pat. No. 10,410,604, issued Sep. 10, 2019), which claims priority to U.S. Provisional Patent Application No. 62/214,077, titled "Elastic Timeline-Based Aggregation, Display and Sharing of Data" and filed on Sep. 3, 2015, each of which is hereby incorporated by reference herein in its entirety.

FIELD

The present disclosure relates generally to the display of information on computing devices. Some embodiments relate specifically to systems and techniques for efficiently aggregating, displaying, and/or sharing data.

BACKGROUND

The most widely employed paradigms for the display of information on computer and mobile screens fall generally into three categories: command line interfaces, where users interact with the computer through successive lines of scrolling text; desktop interfaces, where users navigate content presented in windows that can be moved, stacked, resized, and collapsed; and the smartphone interface, where users navigate in and out of apps represented by a grid of icons on a touch-sensitive screen. Such systems, while employing three different principal methods of input (keyboard, mouse, and touch), share in common the limitation that they facilitate interaction with one application vertical at a time, while generally limiting the ability to view information comparatively, across many applications, and within a broader context.

The ability to display data in time series has been a feature of computer interfaces from their beginning. In file management applications, simple time-ordered lists or arrangements of icons by modification date can convey the concept of sequence. Likewise, in social media applications, time-ordered arrangements of content (e.g., messages posted to a user's social media "feed") by posting date can convey the concept of sequence.

Computers generally fetch data from a storage device shortly before processing the data on a processing device. If the data are located in a fast storage device near the processing device (e.g., in the processing device's registers or in a data cache co-located with the processing device), the time required to fetch the data from the storage device to the processing device is generally quite brief, and therefore may not be perceptible to the computer's user. On the other hand, if the data are located in a storage device that is relatively slow (e.g., a local hard disk) or is not local to the computer (e.g., a remote storage device accessible via a communication network), the time required to fetch the data from the storage device to the processing device can be lengthy, and therefore can be perceptible to the computer's use. To reduce the user-perceptible latency associated with fetching data, some computers or applications "pre-fetch" data that the processing device is expected to request before the processing device actually requests the data, and store the fetched data in a fast, local storage device (e.g., a "cache").

SUMMARY

Although computers sometimes display information in time-ordered lists, such lists convey less information and context than graphical timelines. The use of graphical timelines can add, to the power of indicating sequence in time, the ability to convey simultaneity, continuity, and interval, as well as the value of negative space. Thus, graphical timelines open up possibilities of a richer mode of digital information and identity curation. Graphical timelines also can enhance episodic memory and information retrieval by locating information within a structured and highly intuitive framework.

Although the use of graphical timelines to organize and display data can enhance the quality of the user's experience and improve the user's productivity, the inventors have recognized and appreciated that the user-perceptible latency associated with fetching data for display on the timelines can create a significant barrier to adoption of graphical timelines. Thus, there is a need for systems and techniques for quickly fetching data for display on graphical timelines, such that the user-perceptible latency associated with fetching such data is reduced.

According to an aspect of the present disclosure, a computer-implemented method is provided, including: selecting a data package wherein the data package identifies a plurality of data objects, wherein each data object includes a tag representing a time; identifying a first time period which begins at a first time and ends at a later second time; displaying a first portion of a view of the data package, including displaying first portions of two or more timelines, wherein each timeline is associated with a respective class of data, and wherein the displayed first portion of each timeline represents the first time period, and displaying first graphic items arranged on the first portions of the timelines, wherein each first graphic item displayed on a respective timeline represents one or more of the data objects in the class associated with the respective timeline and tagged with respective times within the first time period; receiving user input indicative of scrolling the timelines to a second time period which begins at a third time after the first time and ends at a fourth time after the second time; in response to the user input, displaying a second portion of the view of the data package, including displaying second portions of the timelines representing the second time period, displaying second graphic items arranged on the second portions of the timelines, wherein each second graphic item on a respective timeline represents one or more of the data objects in the class associated with the respective timeline and tagged with respective times within the second time period, and pre-fetching scroll data representing one or more of the data objects tagged with respective times after the fourth time.

In some embodiments, the method further includes determining a fifth time after the fourth time based on a difference between the fourth time and the second time, wherein the data objects represented by the pre-fetched scroll data are tagged with respective times after the fourth time and before the fifth time. In some embodiments, the method further includes determining a fifth time after the fourth time based on a rate of movement of a user interface component from a position representing the first time period to a position representing the second time period, wherein the user input is received via the user interface component, and wherein the data objects represented by the pre-fetched scroll data are tagged with respective times after the fourth time and before the fifth time. In some embodiments, the method further includes continuing to pre-fetch the scroll data until an amount of the pre-fetched scroll data matches or exceeds a threshold amount.

In some embodiments, the user input is first user input, and the method further includes: receiving second user input indicative of scrolling the timelines to a third time period which begins at a fifth time after the third time and ends at a sixth time after the fourth time; in response to the second user input, displaying a third portion of the view, including displaying third portions of the timelines representing the third time period, and displaying third graphic items arranged on the third portions of the timelines, wherein each third graphic item on a respective timeline represents one or more of the data objects in the class associated with the respective timeline and tagged with respective times within the third time period, and wherein at least a subset of the third graphic items represent the data objects represented by the scroll data.

In some embodiments, the method is performed by a client device, and the pre-fetching includes the client device receiving the scroll data from a server. In some embodiments, the pre-fetched scroll data include the subset of third graphic items. In some embodiments, the pre-fetched scroll data include the tags of the data objects represented by the scroll data. In some embodiments, each data object further includes payload data representing an information payload, wherein the pre-fetched scroll data further include at least (1) a portion of the payload data of the data objects represented by the scroll data, (2) data derived from the payload data of the data objects represented by the scroll data, or (3) a combination thereof. In some embodiments, the method further includes generating, based on the pre-fetched scroll data, the subset of third graphic items.

In some embodiments, the method further includes, in response to receiving the user input, purging data representing one or more of the data objects tagged with respective times before the third time.

In some embodiments, the method further includes pre-fetching zoom-in data associated with the data objects represented by the second graphic items, wherein the zoom-in data represent attributes of the associated data objects, and wherein the attributes represented by the zoom-in data are not represented by the second graphic items. In some embodiments, the user input is first user input, and the method further includes: receiving second user input indicative of zooming the timelines to a third time period starting at a fifth time after the third time and ending at a sixth time before the fourth time; in response to the second user input, displaying a third portion of the view, including displaying third portions of the timelines representing the third time period, and displaying third graphic items arranged on the timelines, wherein each third graphic item displayed on a respective timeline represents one or more of the data objects in the class associated with the respective timeline and tagged with respective times within the third time period.

In some embodiments, the zoom-in data are first zoom-in data, and the method further includes, in response to the second user input, pre-fetching second zoom-in data associated with the data objects represented by the third graphic items, wherein the second zoom-in data represent attributes of the associated data objects, and wherein the attributes represented by the second zoom-in data are not represented by the third graphic items. In some embodiments, the timelines include a first timeline, wherein the second graphic items include a cluster-type graphic item on the second portion of the first timeline, and wherein the cluster-type graphic item represents two or more data objects.

In some embodiments, the third graphic items include two or more graphic items on the third portion of the first timeline, and each of the two or more graphic items represents a different subset of the two or more data objects previously associated with the cluster-type graphic item. In some embodiments, displaying the third portion of the view further includes making a determination to assign the subsets of data objects previously associated with the cluster-type graphic item to the two or more respective graphic items, wherein the determination is based, at least in part, on (1) the times with which the two or more respective data objects are tagged, (2) a duration of the third time period, (3) a total number of data objects to be represented on the third portion of the first timeline, (4) sizes of the subsets of data objects, (5) a length of the third portion of the first timeline when displayed on a display device, or (6) any combination thereof.

In some embodiments, the cluster-type graphic item is a first cluster-type graphic item, and at least one of the two or more graphic items on the third portion of the first timeline is a second cluster-type graphic item representing at least two of the data objects previously associated with the first cluster-type graphic item. In some embodiments, at least one of the two or more graphic items on the third portion of the first timeline is an object-type graphic item representing a single data object previously associated with the cluster-type graphic item, wherein a portion of the zoom-in data represents one or more attributes of the single data object, and wherein displaying the third portion of the view further includes generating at least a portion of the object-type graphic item based on the portion of the zoom-in data representing the one or more attributes of the single data object.

In some embodiments, the timelines include a first timeline, wherein the second graphic items include an object-type graphic item on the second portion of the first timeline, and wherein the object-type graphic item represents a single data object in the class associated with the first timeline. In some embodiments, the object-type graphic item is a first object-type graphic item, wherein the third graphic items include a second object-type graphic item representing the single data object and arranged on the third portion of the first timeline, wherein a portion of the zoom-in data represents one or more attributes of the single data object not represented by the first object-type graphic item, and wherein displaying the third portion of the view further includes generating at least a portion of the second object-type graphic item based on the portion of the zoom-in data representing the one or more attributes of the single data object. In some embodiments, the second object-type graphic item is larger than the first object-type graphic item. In some embodiments, the second object-type graphic item includes the first object-type graphic item. In some embodiments, the method further includes, in response to receiving the second user input, purging data representing one or more of the data objects tagged with respective times outside the third time period.

In some embodiments, the method further includes pre-fetching zoom-out data representing one or more of the data objects tagged with respective times before the third time and one or more of the data objects tagged with respective times after the fourth time. In some embodiments, the user input is first user input, and the method further includes: receiving second user input indicative of zooming the timelines to a third time period starting at a fifth time before the third time and ending at a sixth time after the fourth time; in response to the second user input, displaying a third portion of the view, including displaying third portions of the timelines representing the third time period, and displaying third graphic items arranged on the timelines, wherein each third graphic item displayed on a respective timeline represents one or more of the data objects in the class associated with the respective timeline and tagged with respective times within the third time period, wherein a first subset of the third graphic items represent the data objects tagged with respective times before the third time and represented by the zoom-out data, and wherein a second subset of the third graphic items represent the data objects tagged with respective times after the fourth time and represented by the zoom-out data.

In some embodiments, the zoom-out data are first zoom-out data, and the method further includes, in response to the second user input, pre-fetching second zoom-out data representing one or more of the data objects tagged with respective times before the fifth time and one or more of the data objects tagged with respective times after the sixth time. In some embodiments, the timelines include a first timeline, wherein the second graphic items include at least two graphic items on the second portion of the first timeline, wherein each of the two graphic items represents one or more respective data objects, wherein the third graphic items include a cluster-type graphic item on the third portion of the first timeline, and wherein the cluster-type graphic item represents a set of data objects including the data objects represented by each of the two graphic items. In some embodiments, the cluster-type graphic item is a first cluster-type graphic item, and at least one of the two graphic items on the second portion of the first timeline is a second cluster-type graphic item representing at least two data objects. In some embodiments, at least one of the two graphic items on the second portion of the first timeline is an object-type graphic item representing a single data object.

In some embodiments, the second graphic items include an object-type graphic item on the second portion of the first timeline, and the object-type graphic item represents a single data object in the class associated with the first timeline. In some embodiments, the object-type graphic item is a first object-type graphic item, wherein the third graphic items include a second object-type graphic item representing the single data object and arranged on the third portion of the first timeline, and wherein a portion of the first object-type graphic item represents one or more attributes of the single data object not represented by the second object-type graphic item. In some embodiments, the first object-type graphic item includes the second object-type graphic item. In some embodiments, the second object-type graphic item is smaller than the first object-type graphic item.

In some embodiments, the method further includes, in response to receiving the second user input, purging first portions of data representing one or more of the data objects tagged with respective times within the third time period, and purging first and second portions of data representing one or more of the data objects tagged with respective times outside the third time period.

In some embodiments, the view of the data package corresponds to a mapping between the plurality of data objects and the timelines, and the mapping specifies the respective class of data associated with each timeline. In some embodiments, the mapping specifies that each timeline is associated with a respective class of data including data transmitted through a corresponding communication channel, and each data object in the plurality of data objects represents data transmitted through a corresponding communication channel. In some embodiments, the timelines include first, second, and third timelines, wherein the mapping specifies that the first timeline is associated with a first class of data including data transmitted through a particular social networking platform, the second timeline is associated with a second class of data including data transmitted through a particular social media platform, and the third timeline is associated with a third class of data including data transmitted through a messaging platform.

In some embodiments, the second graphic items include a particular graphic item on the second portion of the first timeline, wherein the particular graphic item represents data extracted from a particular application, and wherein the method further includes identifying user input indicating selection of a particular portion of the particular graphic item, and in response thereto, navigating to the data within the particular application. In some embodiments, the mapping specifies that each timeline is associated with a respective class of data including data transmitted by a corresponding user, wherein each data object in the plurality of data objects represents data transmitted by a corresponding user. In some embodiments, the second graphic items include a particular graphic item on the second portion of the first timeline, wherein the particular graphic item represents data extracted from a particular message transmitted by a particular user via a particular application, and wherein the method further includes identifying user input indicating selection of a particular portion of the particular graphic item, and in response thereto, navigating to the particular message within the particular application.

In some embodiments, the data package is a first data package, wherein the second graphic items include a particular graphic item on the second portion of the timeline, wherein the particular graphic item includes one or more links to one or more second data packages, and wherein the method further includes identifying user input indicating user selection of a particular link to a particular second data package, and in response thereto, displaying a portion of a view of the particular second data package. In some embodiments, the portion of the view of the particular second data package includes respective portions of two or more timelines representing the second time period.

In some embodiments, the tag of each data object includes date data representing a date and time-of-day data representing a time of day, and wherein the time represented by the tag of each data object includes the date and the time of day. In some embodiments, each data object further includes payload data representing an information payload, wherein the method further includes determining whether a particular data object is in a particular class of data based on the payload data of the particular data object.

In some embodiments, the method further includes identifying one or more search criteria, wherein each of the data objects represented by the second graphic items satisfies the one or more search criteria, and wherein pre-fetching the scroll data includes sending, to a server, a pre-fetch request including the one or more search criteria, and receiving, from the server, the scroll data, wherein the scroll data represent data objects satisfying the one or more search criteria and tagged with respective times after the fourth time.

In some embodiments, the method further includes ranking the timelines, wherein the timelines include a first timeline with a first rank and a second timeline with a second, lower rank, and wherein pre-fetching the scroll data includes pre-fetching a first amount of scroll data representing data objects corresponding to the first timeline and a second, smaller amount of scroll data representing data objects corresponding to the second timeline.

In some embodiments, the method further includes generating a first pre-fetch request for first data associated with a data package; generating a second pre-fetch request for second data associated with a data package; determining that the first data and the second data are the same data; coalescing the first and second pre-fetch requests into a single pre-fetch request; and sending the coalesced pre-fetch request to a server.

According to another aspect of the present disclosure, a system is provided, including one or more data processing apparatus programmed to perform operations including: selecting a data package wherein the data package identifies a plurality of data objects, wherein each data object includes a tag representing a time; identifying a first time period which begins at a first time and ends at a later second time; displaying a first portion of a view of the data package, including displaying first portions of two or more timelines, wherein each timeline is associated with a respective class of data, and wherein the displayed first portion of each timeline represents the first time period, and displaying first graphic items arranged on the first portions of the timelines, wherein each first graphic item displayed on a respective timeline represents one or more of the data objects in the class associated with the respective timeline and tagged with respective times within the first time period; receiving user input indicative of scrolling the timelines to a second time period which begins at a third time after the first time and ends at a fourth time after the second time; in response to the user input, displaying a second portion of the view of the data package, including displaying second portions of the timelines representing the second time period, displaying second graphic items arranged on the second portions of the timelines, wherein each second graphic item on a respective timeline represents one or more of the data objects in the class associated with the respective timeline and tagged with respective times within the second time period, and pre-fetching scroll data representing one or more of the data objects tagged with respective times after the fourth time.

According to another aspect of the present disclosure, a computer storage medium is provided, having instructions stored thereon that, when executed by a data processing apparatus, cause the data processing apparatus to perform operations including: selecting a data package wherein the data package identifies a plurality of data objects, wherein each data object includes a tag representing a time; identifying a first time period which begins at a first time and ends at a later second time; displaying a first portion of a view of the data package, including displaying first portions of two or more timelines, wherein each timeline is associated with a respective class of data, and wherein the displayed first portion of each timeline represents the first time period, and displaying first graphic items arranged on the first portions of the timelines, wherein each first graphic item displayed on a respective timeline represents one or more of the data objects in the class associated with the respective timeline and tagged with respective times within the first time period; receiving user input indicative of scrolling the timelines to a second time period which begins at a third time after the first time and ends at a fourth time after the second time; in response to the user input, displaying a second portion of the view of the data package, including displaying second portions of the timelines representing the second time period, displaying second graphic items arranged on the second portions of the timelines, wherein each second graphic item on a respective timeline represents one or more of the data objects in the class associated with the respective timeline and tagged with respective times within the second time period, and pre-fetching scroll data representing one or more of the data objects tagged with respective times after the fourth time.

Particular implementations of the subject matter described in this specification can realize one or more of the following advantages. Pre-fetching data representing data objects that are likely to be displayed on graphical timelines can reduce the user-perceptible latency associated with organizing and displaying data on graphical timelines. Furthermore, fetching or pre-fetching only the portions (e.g., "layers") of data objects that are likely to be displayed can greatly enhance efficiency by reducing the volume of data unnecessarily transmitted from the server where the data objects are stored to the client device where the timelines are displayed.

Conventional computer-based techniques for displaying information generally facilitate interaction with one application vertical at a time, and generally limit the user's ability to view information comparatively, across many applications, and within a broader context. Consequently, computer users working on a particular task often spend considerable amounts of time toggling back and forth between different applications to locate data relevant to the task. For example, a software developer who is working on a software development project as part of a team of developers may view a message from another team member in one application (e.g., a messaging application), then search for communications related to that message in another application (e.g., an email client), then search for files implicated by those communications in yet another application (e.g., a file manager), and then send the files to the other team using one of the communication applications. This process of toggling back and forth between different applications to locate data relevant to a single task generally impairs the productivity of computer users, and also makes inefficient use of computing resources.

Furthermore, the various applications accessed by the user generally organize their data in different ways, making it even more difficult for the user to find data relevant to a particular task when those data are spread across multiple applications. Returning to the example of the software developer, the messaging application may organize messages between the user and different correspondents into different threads or bins, and may organize the messages within a thread in chronological order. In the email client, the user's received emails may be organized into a hierarchy of folders based on the subject matter of the emails, and the user's sent emails may be organized chronologically in a separate folder. In the file manager, the user's files may be organized into a second hierarchy of folders, which often does not match the hierarchy of folders within the email client.

Thus, there is a need for more efficient systems and techniques for accessing, organizing, displaying, and sharing data relevant to a particular task or topic among a group of users. The inventors have recognized and appreciated that the productivity of computer users and the efficiency of computer systems can be enhanced by organizing data relevant to a task or topic into data packages, including data of different types (e.g., text, images, videos, documents, spreadsheets, etc.) and data native to different applications (e.g., text messages, emails, instant messages, source code files, etc.), and displaying the contents of the data packages on graphical timelines. Each timeline can represent a different class of data (e.g., communications with a particular user, data provided over a particular communication channel, etc.), and the data on each timeline can be organized chronologically. In addition, the data packages can be associated with user access rules and content curation rules that govern which users can access the data package and which data are part of the data package.

According to another aspect of the present disclosure, a method is provided, including: identifying one or more data packages for which a first user is a member, and displaying, for each of the identified data packages, an icon corresponding to the data package, wherein each data package is associated with one or more content rules that define content of the data package; receiving selection by the first user of one of the icons wherein the selected icon corresponds to a first data package; identifying a plurality of first data objects associated with the first data package based, at least in part, on the one or more content rules associated with the first data package, wherein each identified first data object is associated with a respective source channel of a plurality of different channels, and is associated with a respective time the first data object was made available on the associated channel, wherein at least two of the channels correspond to different third-party communication applications; and displaying first graphic items arranged on timelines, wherein each timeline is associated with a respective channel, wherein each first graphic item displayed on a respective timeline represents one or more of the first data objects made available on the channel corresponding to the timeline, and wherein each first graphic item is displayed on the respective timeline at a position on the timeline corresponding to the one or more times associated with the first data objects represented by the first graphic item.

In some embodiments, each data package is associated with one or more access rules, and identifying one or more data packages for which the first user is a member includes determining that the respective access rules associated with each of the one or more data packages allow the first user to access the data package. In some embodiments, the access rules associated with the first data package specify at least one secret criterion for accessing the first data package, and identifying one or more data packages for which the first user is a member includes identifying the first user as a member for the first data package based, at least in part, on activity of the first user satisfying the at least one secret criterion. In some embodiments, the method further includes determining, based on the access rules of the first package, what type of access to the first data package is granted to the first user, wherein the type of access includes one or more of: read access, write access, and administrative access. In some embodiments, the access rules for the first data package require the first user to be located in a specified geographic area, the current time to be in a specified time period, or both. In some embodiments, the method further includes determining that the access rules associated with the first data package allow the first user to grant other users access to the first data package by sharing the first data package with the other users.

In some embodiments, identifying a plurality of first data objects associated with the first data package based on the content rules associated with the first data package includes retrieving one or more candidate first data objects from a social network account of a member of the first data package, wherein each of the candidate first data objects includes a respective message. In some embodiments, the content rules associated with the first data package include one or more criteria for inclusion of content in the first data package, and identifying a plurality of first data objects associated with the first data package based on the content rules associated with the first data package further includes discarding any candidate first data objects that do not satisfy the one or more criteria for inclusion. In some embodiments, the one or more criteria for inclusion of a candidate first data object include presence of one or more keywords in a subject line of a message associated with a first data object or presence of the one or more keywords in a hash tag in the message.

In some embodiments, identifying a plurality of first data objects associated with the first data package based on the content rules associated with the first data package includes retrieving one or more messages sent by one or more members of the first data package to one or more other members of the first data package. In some embodiments, a first data object includes a social network post, a micro blog message, an electronic mail message, a text message, an image, an electronic file, and/or a message.

In some embodiments, the method further includes receiving input from the first user placing a new data object on one of the timelines; and providing the new data object to one or more other members of the first data package. In some embodiments, the new data object includes a social network post, an electronic mail message, a text message, a micro blog message, an image, an electronic file, and/or a message.

In some embodiments, the identified data packages include a second data package, and the method further includes: determining that the first data package is related to the second data package; identifying a plurality of second data objects associated with the second data package based, at least in part, on one or more content rules associated with the second data package, wherein each identified second data object is associated with a respective source channel of the plurality of different channels, and is associated with a respective time the second data object was made available on the associated channel; and displaying second graphic items arranged on the timelines, wherein each first graphic item displayed on a respective timeline represents one or more of the second data objects made available on the channel corresponding to the timeline, and wherein each second graphic item is displayed on the respective timeline at a position on the timeline corresponding to the one or more times associated with the second data objects represented by the second graphic item. In some embodiments, determining that the first data package is related to the second data package includes determining that the first data package and the second data package have one or more keywords or hashtags in common.

In some embodiments, the method further includes determining that the first user is connected to a second user on one or more social networks or that the first user and the second user share one or more interests; and based on the determination: generating the first data package, wherein the first user and the second user are members of the first data package, and associating a content rule with the first package, wherein the content rule indicates that content generated by the first user or the second user is eligible for inclusion in the data package.

In some embodiments, the first data package has first content at a first time, and the method further includes performing a hashing operation on the first content of the first data package at the first time, wherein performing the hashing operation produces a hash value; and persistently storing the first content of the first data package and the corresponding hash value. In some embodiments, the hash value is a first hash value, and the method further includes verifying integrity of the first content by performing the hashing operation on the first content again, wherein performing the hashing operation again produces a second hash value, and by comparing the first hash value to the second hash value.

In some embodiments, the first data package is associated with one or more destruction rules specifying at least one criterion for destroying the first data package, and the method further includes determining whether the at least one criterion is satisfied; and if the at least one criterion is determined to be satisfied, destroying the data package. In some embodiments, wherein the at least one criterion for destroying the first data package is satisfied if a current date and time are later than a date and time specified in the criterion.

According to another aspect of the present disclosure, a system is provided, including one or more data processing apparatus programmed to perform operations including: identifying one or more data packages for which a first user is a member, and displaying, for each of the identified data packages, an icon corresponding to the data package, wherein each data package is associated with one or more content rules that define content of the data package; receiving selection by the first user of one of the icons wherein the selected icon corresponds to a first data package; identifying a plurality of first data objects associated with the first data package based, at least in part, on the one or more content rules associated with the first data package, wherein each identified first data object is associated with a respective source channel of a plurality of different channels, and is associated with a respective time the first data object was made available on the associated channel, wherein at least two of the channels correspond to different third-party communication applications; and displaying first graphic items arranged on timelines, wherein each timeline is associated with a respective channel, wherein each first graphic item displayed on a respective timeline represents one or more of the first data objects made available on the channel corresponding to the timeline, and wherein each first graphic item is displayed on the respective timeline at a position on the timeline corresponding to the one or more times associated with the first data objects represented by the first graphic item.

According to another aspect of the present disclosure, a computer storage medium is provided, having instructions stored thereon that, when executed by a data processing apparatus, cause the data processing apparatus to perform operations including: identifying one or more data packages for which a first user is a member, and displaying, for each of the identified data packages, an icon corresponding to the data package, wherein each data package is associated with one or more content rules that define content of the data package; receiving selection by the first user of one of the icons wherein the selected icon corresponds to a first data package; identifying a plurality of first data objects associated with the first data package based, at least in part, on the one or more content rules associated with the first data package, wherein each identified first data object is associated with a respective source channel of a plurality of different channels, and is associated with a respective time the first data object was made available on the associated channel, wherein at least two of the channels correspond to different third-party communication applications; and displaying first graphic items arranged on timelines, wherein each timeline is associated with a respective channel, wherein each first graphic item displayed on a respective timeline represents one or more of the first data objects made available on the channel corresponding to the timeline, and wherein each first graphic item is displayed on the respective timeline at a position on the timeline corresponding to the one or more times associated with the first data objects represented by the first graphic item.

In some embodiments, the techniques described herein may be used beneficially to implement a cross-platform search with spatially-organized results, a publishing tool, a social media tool, a messaging tool, a software development/management tool, a news archive or aggregator, a data management tool, etc.

Other aspects and advantages of the invention will become apparent from the following drawings, detailed description, and claims, all of which illustrate the principles of the invention, by way of example only.

The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 16:
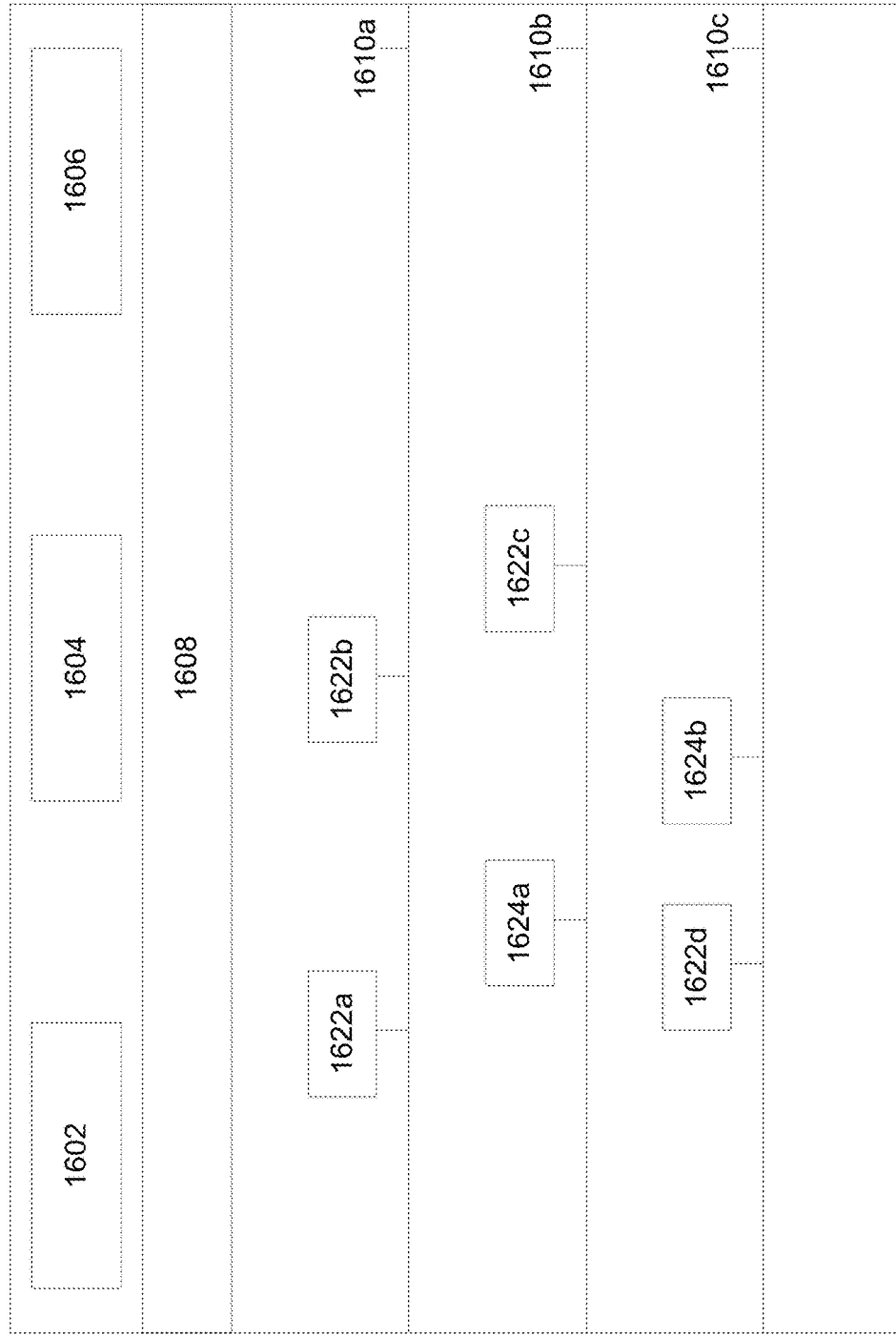
FIG. 16 is a block diagram of a user interface, according to some embodiments.

FIG. 16 shows a user interface 1600, according to some embodiments. The user interface 1600 may include one or more timelines 1610 and one or more control components ("widgets") 1602-1608 for controlling what information is displayed on the timelines 1610. In some embodiments, a user may use the widgets 1602-1608 to identify a data package, a view of the data package, and a time period. In response, the user interface 1600 may display portions of the timelines corresponding to the specified time period, with graphic items (1622, 1624) representing data objects identified by the data package displayed on the timelines. The graphic items may be assigned to different timelines according to the view specified by the user, and may be arranged chronologically on the timelines 1610 to which they are assigned.

In some embodiments, the user interface 1600 includes a data package widget 1602 for specifying one or more data packages to display on the timelines, a view widget 1604 for specifying a view of the displayed data package(s), a filter widget 1606 for specifying filtration criteria (alternately referred to herein as "search criteria"), and/or one or more navigation widgets 1608 for specifying one or more time periods to be shown on the timelines. The widgets 1602-1608 may be implemented using any suitable user interface components, including, without limitation, text input boxes, drop-down menus, drop-down lists, list boxes, sliders, scroll bars, zoom controls, checkboxes, multi-selection lists, radio buttons, checkboxes, etc. For example, the navigation widget(s) 1608 may include a zoom control (e.g., for zooming out to show a longer time period on the timelines or zooming in to show a shorter time period on the timelines), a scroll bar (e.g., for scrolling to show an earlier or later time period on the timelines), arrow buttons (e.g., for scrolling). In some embodiments, the time period displayed on the timelines may be adjusted using gestures (e.g., swiping left to scroll to a later time period, swiping right to scroll to an earlier time period, pinching in to zoom out to a longer time period, pinching out to zoom in to a shorter time period, etc.).

The user interface 1600 may display graphic items representing data objects from one or more "data packages" (alternately referred to herein as "spheres") on the timelines 1610. In some embodiments, a data package identifies one or more data objects, which may be contained within the data package or stored remotely and referenced by the data package using, for example, pointers or links. These and other aspects of data packages are described in further detail below.

In some embodiments, a data object includes or is associated with a tag, which indicates a time corresponding to the data object. The time corresponding to the data object may include a time-of-day, a date, a day of the week, a month, a year, a decade, a century, a time period relative to a reference time, any other suitable representation of time, or any combination thereof. In some embodiments, the time corresponding to the data object represents the time the data object was created, the time the contents of the data object were created, the time the contents of the data object were provided on a data channel, a time specified by a user, or any other suitable time.

In some embodiments, a data object includes or is associated with a data payload, which represents payload information. The data payload may include any suitable data, including, without limitation, one or more text messages, emails, images, videos, documents, files, etc. Also, the data payload may be extracted or obtained from any suitable application, including, without limitation, a social networking application, a social media application, a communication application (e.g., an email client, a text messaging application, an instant messaging application), etc.

In some embodiments, portions of the payload data of a data object may be assigned to two or more data layers. In some embodiments, the data object includes layer data indicating which portions of the data object's payload data are assigned to which layers. The data layers may be organized hierarchically, such that some data layers (e.g., lower-level layers) include other data layers (e.g., higher-level layers), or portions thereof. For example, a first layer $L_1$ may include portions of the payload data suitable for representing the data object at a high level of abstraction (a low degree of detail), a second layer $L_2$ may include portions of the payload data suitable for representing the data object at lower level of abstraction (a greater degree of detail), and so on. Some layers may include data that can be derived from the payload data but are not actually stored in the payload data. As described in further detail below, the layering of the payload data may facilitate efficient implementations of the user interface 1600.

Returning to FIG. 16, the user interface 1600 may include one or more timelines 1610. Collectively, the timelines 1610 and graphic items (1622, 1624) arranged thereon represent a specified view of one or more specified data package(s), or a portion thereof. In some embodiments, the displayed portion of each timeline corresponds to a specified time period. In some embodiments, each timeline is associated with a corresponding class of data object, and the specified view corresponds to a mapping between the data objects of the specified data package(s) and the timelines, wherein the mapping specifies the class of data object associated with each timeline.

Any suitable view of the data package(s) may be displayed. Some examples of suitable views may include a "channel view" (in which each timeline corresponds to an application or channel through which data are transmitted), a "user view" (in which each timeline corresponds to a user or group of users); a "source code repository view" (in which each timeline corresponds, for example, to a source code repository or a branch or trunk within a repository); a "topical view" (in which each timeline corresponds to a topic); a "geographical view" (in which each timeline corresponds, for example, to a geographical, geopolitical, or spatial region); etc.

Each graphic item (1622, 1624) displayed on a particular timeline may represent one or more data objects in the specified data package(s) that are in the data class associated with the timeline and tagged with time(s) within the time period represented by the timeline. In some embodiments, different types of graphic items may be displayed, for example, object-type graphic items 1622 and/or cluster-type graphic items 1624.

In some embodiments, an object-type graphic item 1622 (alternately referred to herein as an "origami") represents a single data object. The form (e.g., size, shape, etc.) of an object-type graphic item 1622 may be adjustable, and the user interface 1600 may automatically adjust the form of an object-type graphic item 1622 to display more or less information about the corresponding data object. In some embodiments, the forms of an object-type graphic item may correspond to the layers of payload data in the corresponding data object, such that a first form $F_1$ of the object-type graphic item represents data from (or based on) a first layer $L_1$ of the payload data, a second form $F_2$ of the object-type graphic item represents data from (or based on) a second layer $L_2$ of the payload data, and so on. Some examples of object-type graphic items 1622 are shown in FIGS. 2-15 and 19-20D, and described below. See, for example, FIG. 11, which shows examples of different forms of object-type graphic items.

The transition from a smaller form $F_1$ of an object-type graphic item (representing, for example, a higher layer of payload data) to a larger form $F_2$ of the object-type graphic item (representing, for example, a lower level of payload data) may be referred to herein as "unfolding an origami" or "unfolding." In some embodiments, an "unfolded" form $F_{K+1}$ of an object-type graphic item may comprise the graphic content from the adjacent "folded" form $F_K$ of the object-type graphic item, in combination with additional graphic content representing lower-level details extracted from or based on a lower level of payload data.

Likewise, the transition from a larger form $F_2$ of an object-type graphic item (representing, for example, a lower layer of payload data) to a smaller form $F_2$ of the object-type graphic item (representing, for example, a higher level of payload data) may be referred to herein as "folding an origami" or "folding." In some embodiments, a "folded" form $F_K$ of an object-type graphic item may comprise a subset of the graphic content from the adjacent "unfolded" form $F_{K+1}$ of the object-type graphic item, thereby omitting lower-level details of the data object.

In some embodiments, when the user interface 1600 displays a channel view of a data package, the object-type graphic item representing a particular data object may include an image of the user who provided the data object's payload. See, for example, graphic item 2022 in FIG. 20A. In some embodiments, when the user interface 1600 displays a user view of a data package, the object-type graphic item representing a particular data object may include an image corresponding to the channel/application through which the data object's payload was provided. See, for example, graphic item 2052 in FIG. 20C.

In some embodiments, a cluster-type graphic item 1624 (alternately referred to herein as a "cluster") represents two or more data objects. The user interface 1600 may, for example, display a cluster-type graphic item on a portion of a timeline when the density of data objects tagged with times the time period corresponding to that portion of the timeline is relatively high. In this way, the cluster-type graphic item can convey that there are a relatively large number of data objects represented in a relatively short time period, and the user can the zoom in on that time period, if desired, to obtain more detailed information about the corresponding data objects.

The form (e.g., size, shape, etc.) of a cluster-type graphic item 1624 may be adjustable, and the user interface 1600 may automatically adjust the form of an cluster-type graphic item 1624 (e.g., to display more or less information about the corresponding data objects). In some embodiments, at least some forms of a cluster-type graphic item may correspond to layers of payload data in the corresponding data objects, such that a first form $F_1$ of the cluster-type graphic item represents data from (or based on) a first layer $L_1$ of the objects' payload data, a second form $F_2$ of the cluster-type graphic item represents data from (or based on) a second layer $L_2$ of the objects' payload data, and so on. Some examples of object-type graphic items 1622 are shown in FIGS. 2, 7-9, 13 and 14, and described below.

Returning again to FIG. 16, the user interface 1600 may be capable of performing various operations, including, for example, scrolling the timelines (to earlier or later time periods), zooming the timelines (to longer or shorter time periods), sorting the timelines, filtering the data displayed on the timelines, responding to selection of a graphic item or portion thereof, transforming the display from one view of the data package(s) to another view, etc. These operations are described in further detail below.

In response to receiving user input indicative of scrolling the timelines (e.g., swiping, moving a scroll bar, selecting an arrow button, etc.), the user interface 1600 may scroll the timelines to show an earlier or later time period. When the timelines are scrolled from a first time period to a second time period, graphic items representing data objects tagged with times in the second time period are displayed on the timelines, and graphic items representing data objects tagged with times not in the second time period are removed from the display.

In response to receiving user input indicative of zooming the timelines (e.g., pinching, selecting a zoom control, entering a zoom factor, etc.), the user interface 1600 may zoom the timelines to show a time period of the indicated duration. As the user interface 1600 "zooms in" on time periods of shorter and shorter duration, the graphic items representing data objects may transform (e.g., "unfold") into forms showing increasing levels of detail about the corresponding data objects (e.g., forms corresponding to or based on lower layers of the data objects' payload data).

In addition or in the alternative, as the user interface 1600 zooms in, a cluster-type graphic item 1624 may fragment into two or more graphic items, each of which may itself be a cluster-type graphic item 1624 or an object-type graphic item 1622. As described above, a cluster-type graphic item may be displayed on a portion of a timeline when the density of data objects tagged with times the time period corresponding to that portion of the timeline is relatively high. As the user interface zooms in on such a time period, the portion of the timeline corresponding to that time period becomes larger, and the density of the data objects corresponding to that portion of the timeline decreases (in much the same way that the density of a gas decreases when the volume of the gas's container increases). As the density of the data objects decreases, there is additional space available on the timeline to display more information about the data objects. The user interface 1600 may take advantage of this additional space by fragmenting the cluster-type graphic item into two or more graphic items. The determination to fragment a cluster-type graphic item into two or more graphic items may be based on (1) the time tags of the data objects represented by the cluster or represented by any adjacent graphic items on the timeline, (2) the duration of the time period represented by the displayed portion of the timeline, (3) the total number of data objects to be represented on the displayed portion of the timeline, (4) the number of data objects in the cluster, (5) the length of the displayed portion of the timeline as displayed on a display device, and/or (6) any other suitable criteria.

Likewise, as the user interface 1600 "zooms out" to time periods of longer and longer duration, the graphic items representing data objects may transform (e.g., "fold") into forms showing decreasing levels of detail about the corresponding data objects (e.g., forms corresponding to or based on higher layers of the data objects' payload data).

In addition or in the alternative, as the user interface 1600 zooms out, object-type graphic items may merge to form a cluster-type graphic-item, and object-type or cluster-type graphic items may merge with existing cluster-type graphic-items. As the user interface zooms out, the portion of the timeline corresponding to a particular time period becomes smaller, and the density of the data objects corresponding to that portion of the timeline increases (in much the same way that the density of a gas increases when the volume of the gas's container decreases). As the density of the data objects increases, there is less space available on the timeline to display information about each of the data objects. The user interface 1600 may address this situation by creating or expanding cluster-type graphic items. The determination to assign a candidate data object to a cluster-type graphic item may be based on (1) the time tags of the candidate data object and any data objects already in the cluster, (2) the duration of the time period represented by the displayed portion of the timeline, (3) the total number of data objects to be represented on the displayed portion of the timeline, (4) the number of data objects already in the cluster, (5) the length of the displayed portion of the timeline as displayed on a display device, and/or (6) any other suitable criteria. In some embodiments, the user interface 1600 permits graphic items to overlap to a specified extent (e.g., 40% of the width of the graphic item having the smaller width) before merging the graphic items into a cluster-type graphic item.

In some embodiments, the user interface 1600 display the timelines 1610 in an order determined by suitable ordering or ranking criteria. For example, the user interface 1600 may order the timelines from top-to-bottom in descending order of "activity" or "importance". The "activity" rankings of the timelines may, for example, be determined using heuristics based on the rate at which the user (or a group of users, for example, the group of users who have permission to access the data package) interacts with graphic items on each timeline, the rate at which the user (or a group of users) adds new data objects to each timeline, how recently new data objects were added to each timeline, etc. The "importance" rankings of the timelines may, for example, be determined using heuristics based on the rate at which particular users (e.g., supervisors or managers in an organizational setting, specified users, etc.) interact with or add new data objects to each timeline, attributes of the data objects added to each timeline (e.g., attributes indicating urgency or importance), etc. In some embodiments, the user interface 1600 may reorder the timelines dynamically, as the relevant rankings of the timelines change. In some embodiments, the user may specify the order in which the timelines are displayed and/or pin one or more timelines in specified locations within the user interface.

In some embodiments, the user interface 1600 may filter a view of a data package such that the displayed graphic items represent only data objects that satisfy specified filtering criteria (or search criteria). For example, in response to the user specifying filter criteria (e.g., keywords, users, data types, etc.) using filter widget 1606, the user interface 1600 may exclude data objects in the data package that do not satisfy the specified criteria from the view, such that these data objects are not represented by graphic items on the timelines.

In response to the user selecting a cluster-type graphic item 1624 (e.g., clicking on the graphic item, hovering the mouse pointer over the graphic item, touching the graphic item, etc.), the user interface 1600 may take any suitable action. In some embodiments, selecting a cluster-type graphic item 1624 (or a particular portion of the graphic item, for example, a particular icon) causes the user interface 1600 to display a "super-feed" (e.g., a list of object-type graphic items corresponding to the data objects represented by the cluster). In some embodiments, selecting a cluster-type graphic item 1624 (or a particular portion of the graphic item, for example, another icon) causes the user interface 1600 to zoom in on the time period occupied by the data objects in the cluster (e.g., by zooming in on substantially the smallest time period that includes the tagged times of all the data objects in the cluster). In some embodiments, selecting a particular portion of a cluster-type graphic item 1624 causes the user interface 1600 to display, on the timelines 1610, a view of a data package related to the data objects represented by the graphic item 1624. This operation may be referred to herein as a "wormhole" operation, and the graphic item that is used to initiated the wormhole operation may be referred to herein as a "wormhole cluster".

In response to the user selecting an object-type graphic item 1622, the user interface 1600 may take any suitable action. In some embodiments, selecting an object-type graphic item (or a particular portion of the graphic item, for example, a particular icon) causes the item to unfold from its current form $F_K$ (e.g., into the adjacent form $F_{K+1}$, into the fully unfolded form, or into any other suitable form). In some embodiments, selecting an object-type graphic item (or a particular portion of the graphic item, for example, a different icon) causes the device displaying the user interface 1600 to load (or navigate to) the data object corresponding to the graphic item in the application from which the data object was obtained. In this manner, the user interface 1600 can perform functions generally associated with a file manager or file browser. In some embodiments, selecting a particular portion of an object-type graphic item 1622 causes the user interface 1600 to display a view of a data package related to the data object represented by the graphic item 1622 on the timelines 1610. This operation may be referred to herein as a "wormhole" operation, and the graphic item that is used to initiated the wormhole operation may be referred to herein as a "wormhole origami".

Figure 19B:
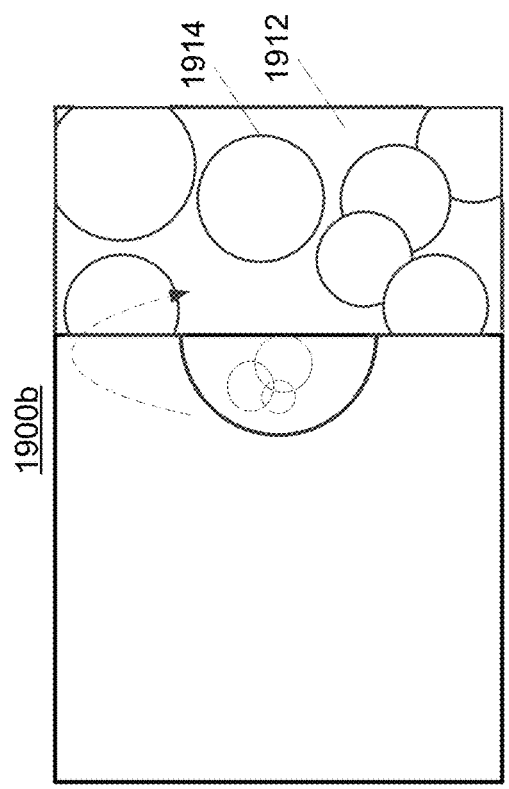
FIGS. 19A, 19B, 19C, and 19D each show a block diagram of a form of graphic item, according to some embodiments.
Figure 19D:
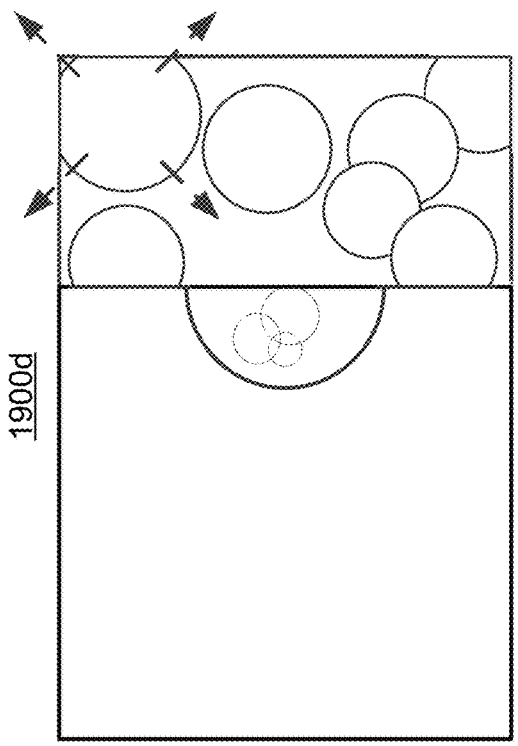
Figure 19A:
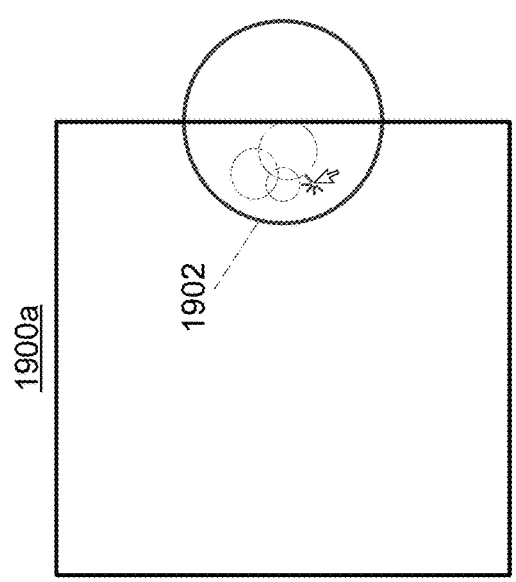
Figure 19C:
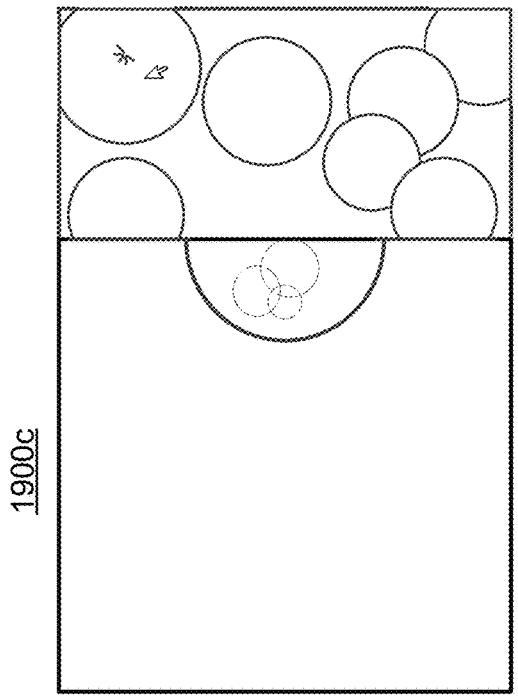

FIGS. 19A-D show block diagrams of a graphic item 1900, according to some embodiments, which illustrate some of the operations that the user interface 1600 may perform when a user selects the graphic item 1900. The graphic item 1900 may be an object-type graphic item or a cluster-type graphic item. In the example of FIG. 19A, the graphic item 1900*a* includes an affordance 1902 (e.g., an icon, button, link, etc.) representing other data packages ("spheres"). When the user selects the affordance 1902, the graphic item may unfold as shown in FIG. 19B. The unfolded graphic item 1900*b* may include a panel 1912 (e.g., a foam panel, as described below), with one or more affordances 1914 corresponding to other data packages. The data package affordances may be displayed in a list, displayed graphically as in FIG. 19B, or represented in any other suitable manner. When the user selects an affordance 1914 corresponding to a data package, as shown in FIG. 19C, the user interface may being loading a view of that data package onto the timelines 1610. In some embodiments, when the user interface begins loading the selected data package, an image representing the data package (e.g., an image of a sphere) may expand to fill a portion of the user interface, as represented by the arrows in FIG. 19D, thereby conveying to the user that a view of the selected data package will be displayed.

In some embodiments, the data packages represented by the data package affordances 1914 in the panel 1912 may be related to the data package(s) currently displayed, or related to the data object(s) represented by the graphic item 1900. The data packages corresponding to the affordances may be ranked of scored according to suitable criteria (e.g., degree of relevance to the data object(s) represented by the graphic item 1900), and the data package affordances 1914 may be arranged in a manner that conveys the rankings or the scores of the corresponding data packages. For example, the affordances 1914 corresponding to data packages with higher ranks or scores may be larger than the affordances 1914 corresponding to data packages with lower ranks or scores, and/or may be displayed in more prominent positions (e.g., earlier in a list) than the affordances 1914 corresponding to data packages with lower ranks or scores.

Any suitable techniques or criteria may be used to determine which data packages are "related" to the data object(s) represented by a particular graphic item, and/or to assigns relevance rankings or scores to the related data packages. For example, the system may operate a "data package crawler" that crawls and indexes the data packages, and may identify related data packages by using a "data package search engine" to search the index for keywords extracted from the data payload(s) of the data object(s) represented by the graphic item 1900. As another example, the system may operate a "data package ranking module" that ranks or scores the data packages identified by the "data package search engine" based on analysis of user clicks in the panels 1912, dwell time, etc. Other examples of criteria suitable for determining whether and to what extent a data package DP is related to the data object(s) represented by a graphic item 1900 may include (1) the extent to which the owner(s) or originator(s) of the data object(s) represented by the graphic item 1900 have provided data objects that appear in the data package DP, (2) the extent to which keywords or other textual content extracted from the payload(s) of the data object(s) represented by the graphic item 1900 appear in the data objects of the data package DP, (3) the extent to which geotags extracted from the payload(s) of the data object(s) represented by the graphic item 1900 represent locations proximate to locations represented by geotags in the data objects of the data package DP.

As just one example of a wormhole operation, a user ("User 1") may be using the user interface 1600 to display a view of a data package ("DP X") related to the development of the back-end of a software tool. The user interface 1600 may display a graphic item representing an email sent by another user ("User 2") to User 1. The email mentions a software component being developed by a third user ("User 3"), which provides an interface to a feature implemented in the software's back-end. The interface component is part of the front-end of the software, and communications relating to the interface component are generally not included in DP X. However, after reading the email, User 1 decides to access another data package ("DP Y") related to the development of the interface component. To find DP Y, User 1 clicks on the affordance 1902 in the graphic item 1900 representing the email, and the graphic item unfolds to show data package affordances 1914 representing other data packages, including a DP Y. User 1 can then select the affordance representing DP Y to load a view of DP Y on the timelines.

As described above, a user may use view widget 1604 to control which view of a data package is displayed by the user interface 1600. If the user interface 1600 is already displaying one view of a data package, and the user provides input instructing the user interface to display a different view of the data package, the user interface 1600 may display an animation illustrating a transformation between the two views.

FIGS. 20A-20D show screen shots of a user interface before, during, and after a transformation between different views of a data package, according to some embodiments. In the screen shot of FIG. 20A, a channel view of a data package is displayed, with four timelines 2010*a*-2010*d* corresponding to four applications or data channels (e.g., Facebook, Messenger, Instagram, and Twitter, respectively), and with four images 2012*a*-2012*d* representing the data channels (or applications) corresponding to the respective timelines 2010*a*-2010*d*. Object-type graphic items 2022-2030 representing data objects corresponding to five different users are displayed on the timelines, including graphic items 2022*a-d* representing data objects corresponding to (e.g., originated or provided by) a first user, graphic items 2024*a-e* representing data objects corresponding to a second user, graphic items 2026*a-b* representing data objects corresponding to a third user, graphic items 2028*a-b* representing data objects corresponding to a fourth user, and graphic items 2030*a-b* representing data objects corresponding to a fifth user. Also, in the example of FIG. 20A, each graphic item representing a data item corresponding to a particular user includes graphic content (e.g., an image) representing that user.

Figure 20A:
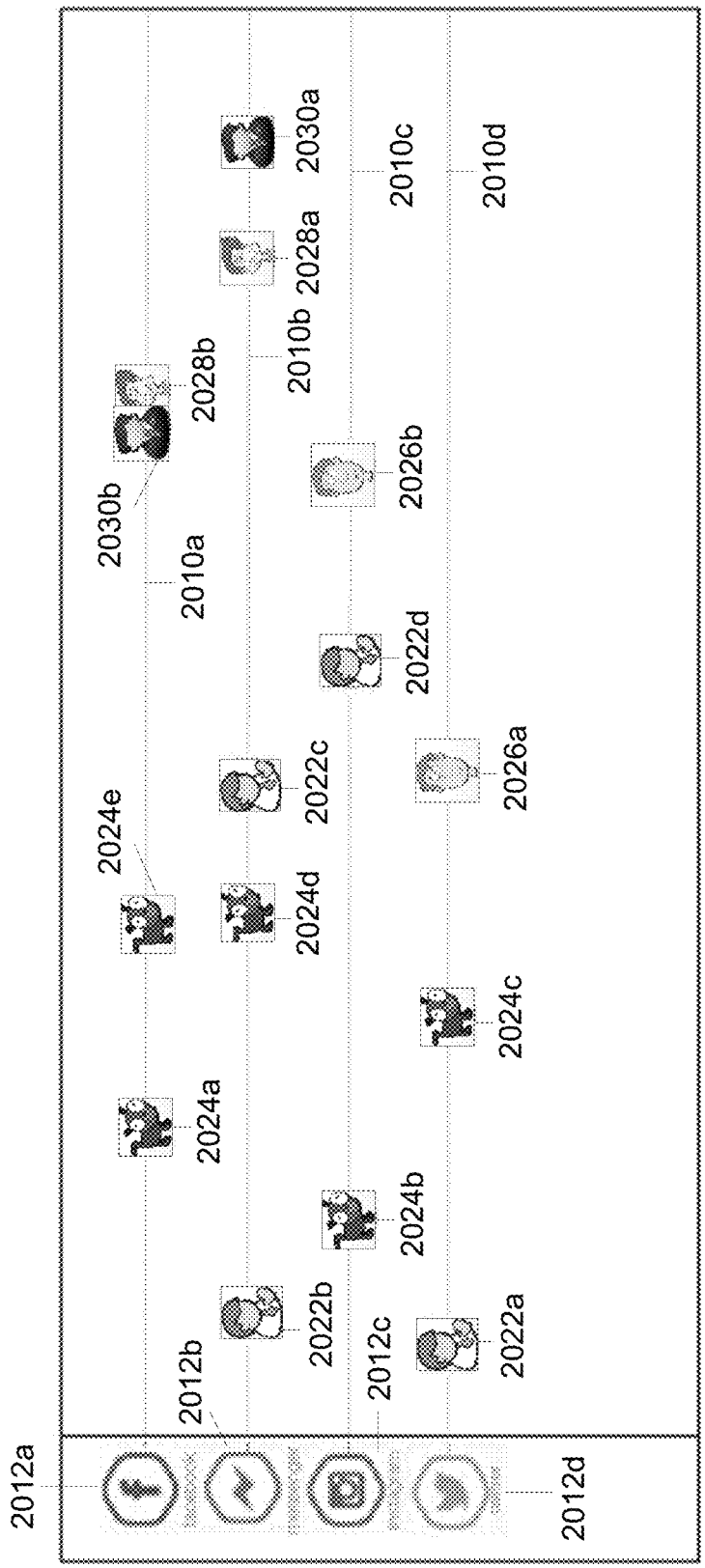
FIGS. 20A, 20B, 20C, and 20D are examples of screen shots showing states of a user interface during a transformation between views of a data package, according to some embodiments.
Figure 20B:
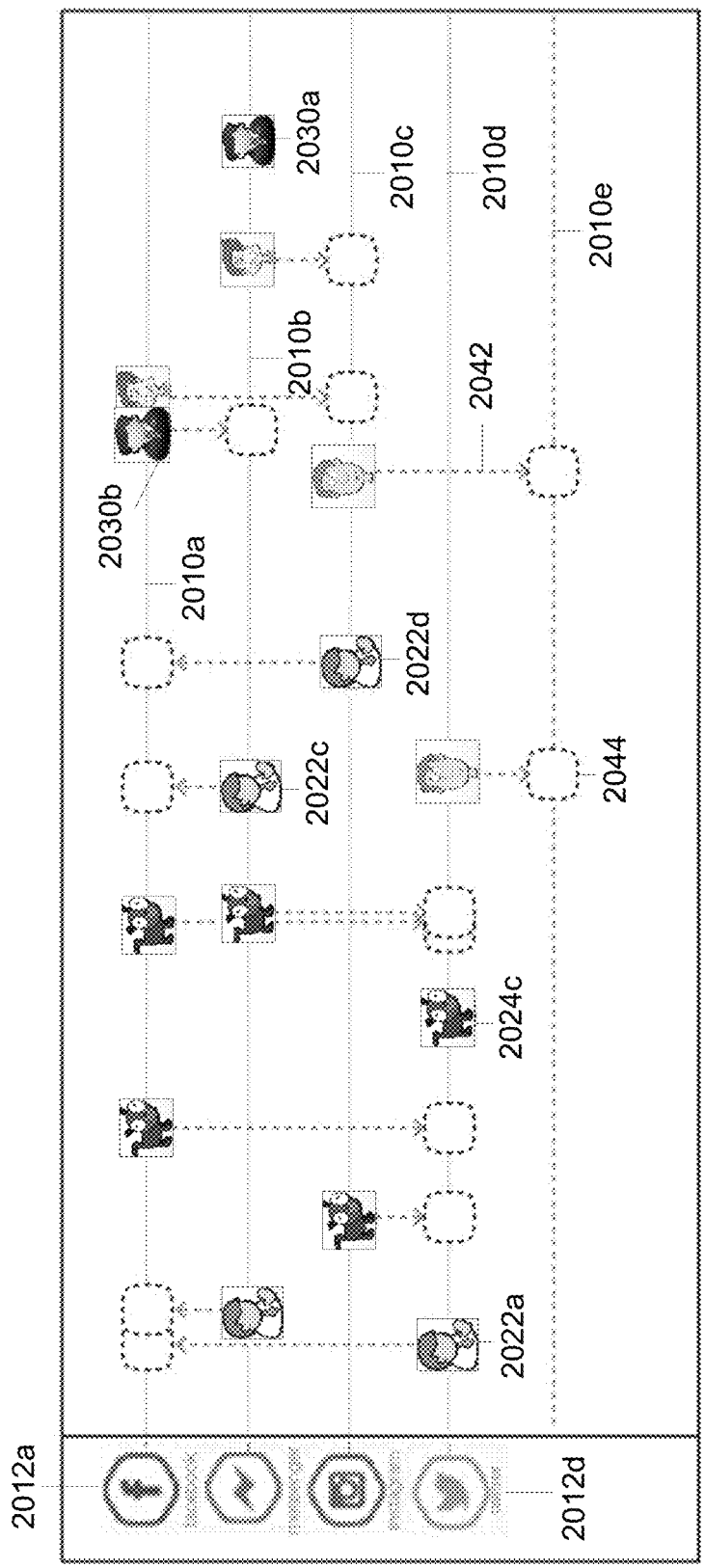
Figure 20C:
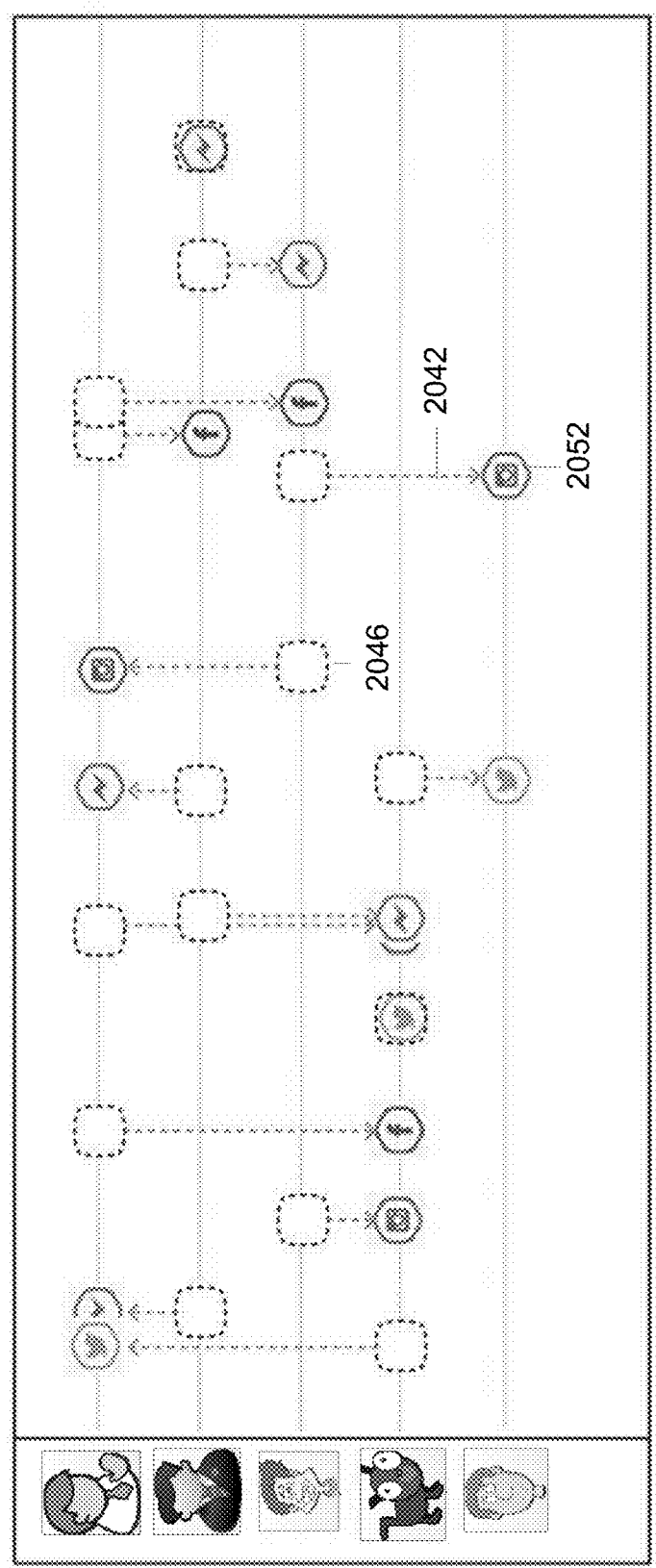
Figure 20D:
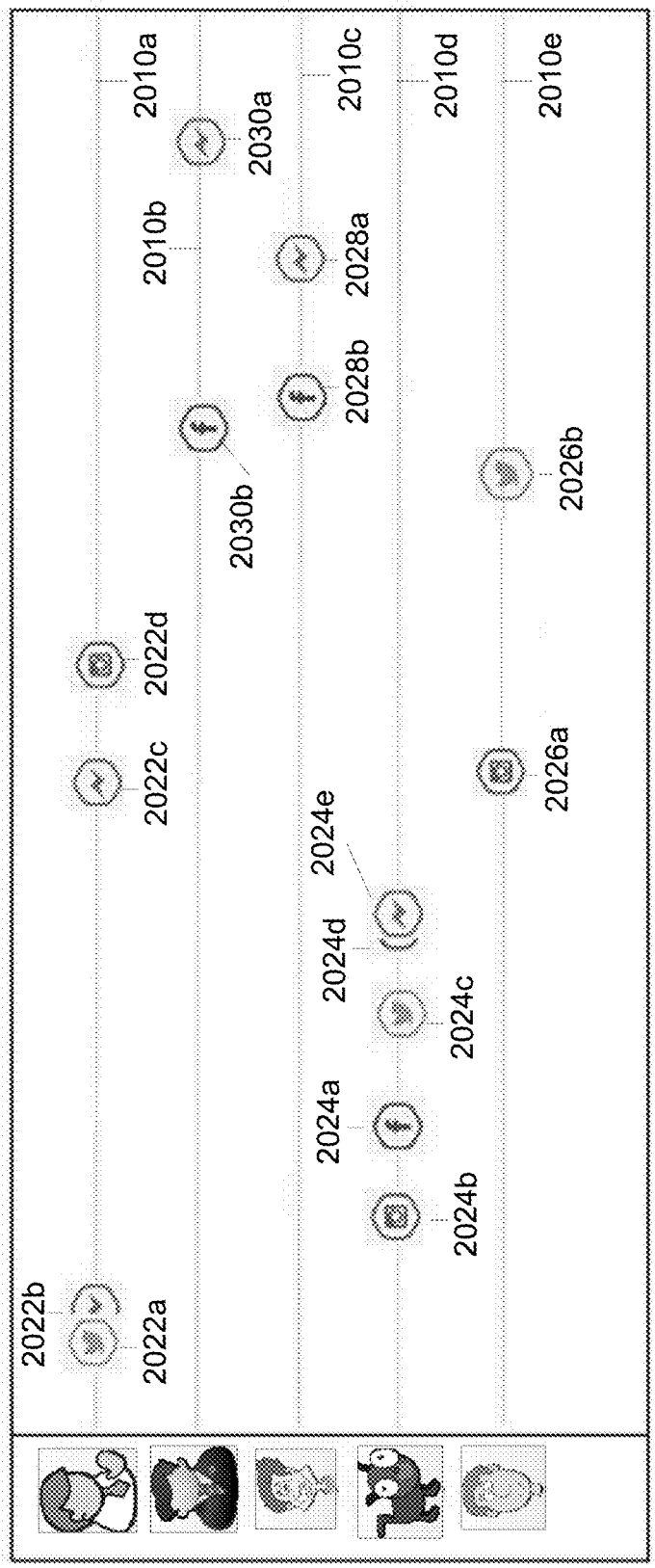

In the screen shot of FIG. 20D, a user view of the same time period and data package is displayed, with five timelines 2010*a*-2010*e* corresponding to the five users. In particular, the five timelines 2010*a*, 2010*b*, 2010*c*, 2010*d*, and 2010*e* correspond, respectively, to the first user, the fifth user, the fourth user, the second user, and the third user, and the graphic content (e.g., image) representing each user is displayed adjacent to the timeline corresponding to that user. Object-type graphic items 2022-2030 are displayed on the timelines, including graphic items 2022*a-d* representing data objects corresponding to the first user and displayed on timeline 2010*a*, graphic items 2030*a-b* representing data objects corresponding to the fifth user and displayed on timeline 2010*b*, graphic items 2028*a-b* representing data objects corresponding to the fourth user and displayed on timeline 2010*c*, graphic items 2024*a-e* representing data objects corresponding to the second user and displayed on timeline 2010*d*, and graphic items 2026*a-b* representing data objects corresponding to the third user and displayed on timeline 2010*e*. Also, in the example of FIG. 20D, each graphic item representing a data item corresponding to a particular data channel or application includes graphic content (e.g., an image) representing that data channel or application.

Thus, in the views of FIGS. 20A and 20D, one attribute of the data object(s) represented by a graphic item is visualized spatially by positioning the graphic item on a timeline corresponding to that attribute, and another attribute of the data object(s) represented by the graphic item is visualized graphically by displaying, on the graphic item, graphic content corresponding to the other attribute. In particular, in the example of FIG. 20A, representing a channel view, the spatially visualized data attribute is the data's channel, and the graphically visualized attribute is the data's originating or contributing user. In the example of FIG. 20B, representing a user view, the spatially visualized data attribute is the data's originating or contributing user, and the graphically visualized attribute is the data's channel.

More generally, in a first view of a data package, a "primary attribute" of the data object(s) represented by a graphic item may be visualized spatially by positioning the graphic item on a timeline corresponding to that primary attribute, and a "secondary attribute" of the data object(s) represented by a graphic item may be visualized graphically by displaying (on the graphic item) graphic content representing the secondary attribute. In a second view of the data package, the "primary attribute" of the data object(s) represented by a graphic item may be visualized graphically by displaying (on the graphic item) graphic content representing the primary attribute, and the "secondary attribute" of the data object(s) represented by the graphic item may be visualized spatially by positioning the graphic item on a timeline corresponding to that secondary attribute.

In such cases, a transformation from the first view to the second view of the data package may be effected by (1) adjusting the number of timelines to match the number of unique values of the secondary attribute observed in the data package's data objects, (2) moving the graphic items to the timelines corresponding to the secondary attributes of the graphic items' data objects (without changing the graphic items' chronological positions), (3) changing the graphic content on the graphic items to represent the primary attributes of the graphic items' data objects, and (4) changing the graphic content corresponding to each timeline to represent the secondary attribute corresponding to that timeline. Likewise, a transformation from the second view to the first view of the data package may be effected by (1) adjusting the number of timelines to match the number of unique values of the primary attribute observed in the data package's data objects, (2) moving the graphic items to the timelines corresponding to the primary attributes of the graphic items' data objects (without changing the graphic items' chronological positions), (3) changing the graphic content on the graphic items to represent the secondary attributes of the graphic items' data objects, and (4) changing the graphic content corresponding to each timeline to represent the primary attribute corresponding to that timeline.

The screen shots of FIGS. 20B and 20C represent intermediate stages of the user interface during the above-described transformation from the channel view of the data package to the user view of the data package, according to some embodiments. In the example of FIG. 20B, each vertical dashed line 2042 represents the path of movement of a corresponding graphic item, and the arrows at the ends of the vertical dashed lines represent the direction of the graphic item's movement. Each dashed perimeter 2044 represents the starting location of a corresponding graphic item, which is connected to the dashed perimeter 2044 by a corresponding vertical dashed line. The horizontal dashed line 2010e represents a new timeline. (In some embodiments, the user interface actually displays the dashed lines shown in FIG. 20B during the animated transformation. In some embodiments, the dashed lines are not displayed.)

In the example of FIG. 20C, each vertical dashed line 2042 represents the path of movement of a corresponding graphic item, and the arrows at the ends of the vertical dashed lines represent the direction of the graphic item's movement. Each dashed perimeter 2046 represents the starting location of a corresponding graphic item, which is connected to the dashed perimeter 2044 by a corresponding vertical dashed line. (In some embodiments, the user interface actually displays the dashed lines shown in FIG. 20C during the animated transformation. In some embodiments, the dashed lines are not displayed.)

In the animation illustrated in FIGS. 20B and 20C, the graphic content on the graphic items may be changed to represent the primary attributes of the graphic items' data objects at any time during the animation, and the graphic content corresponding to each timeline may be changed to represent the secondary attribute corresponding to that timeline at any time during the animation. The movement of the graphic items and the change in the graphic content of the graphic items may occur gradually, to convey to the user that each graphic item continues to represent the same data object(s) before and after the transformation is completed.

In the example of FIGS. 20A-20D, each of the illustrated graphic items is an object-type graphic item. In some embodiments, a transformation from a first view of a data package to a second view of a data package may be initiated while one or more cluster-type graphic items are displayed. In such cases, completing the transformation may involve breaking up the cluster into constituent object-type graphic items and moving the object-type graphic items from a source cluster on one timeline to positions on two or more destination timelines, depending on the attributes of the data objects represented by the cluster-type graphic item. Likewise, a transformation from a first view of a data package to a second view of a data package may result in the formation of clusters, depending on how the graphic items are arranged when the transformation is complete.

Figure 17:
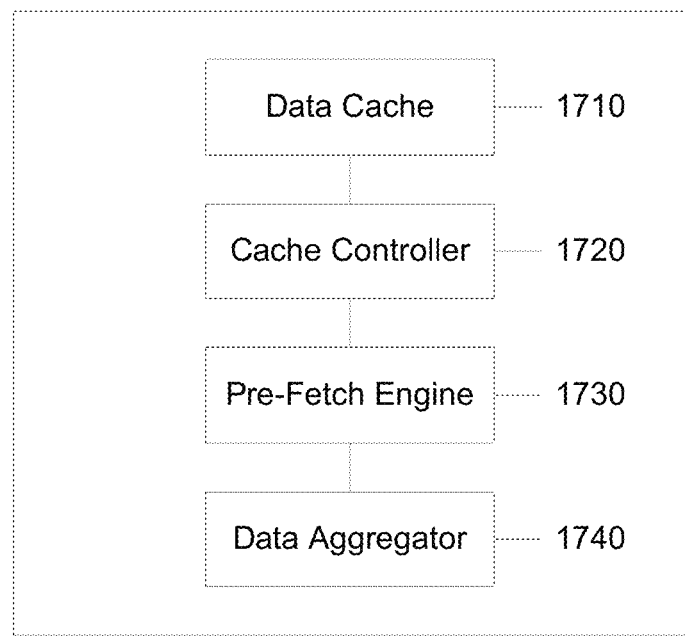
FIG. 17 is a block diagram of an architecture of a pre-fetching module, according to some embodiments.

FIG. 17 shows a block diagram of one possible architecture of pre-fetching module 1700 of a user interface 1600, according to some embodiments. In some embodiments, the pre-fetching module 1700 fetches data corresponding to data packages and/or data objects before the user interface 1600 requests such data, based on predictions that the user interface 1600 will request the pre-fetched data soon (e.g., within a specified time period, or within a specified number of data requests.) In some embodiments, data packages and/or data objects identified by the data packages may be stored remote from a client device that displays the user interface 1600. For example, the data packages and/or data objects may be stored on one or more servers communicatively coupled to the client device by one or more communication networks (e.g., the Internet). In some embodiments, pre-fetching the data corresponding to such data packages and/or data objects greatly reduces the user perceptible latency associated with displaying views of data packages on timelines.

In the example of FIG. 17, the pre-fetching module includes a data cache 1710, a cache controller 1720, a pre-fetching engine 1730, and a data aggregator 1740. Each of these components is described in further detail below.

In some embodiments, the data cache 1710 caches data representing data objects. The data cache 1710 can hold data representing data objects recently displayed by the user interface. Alternatively or in addition, the data cache 1710 can hold pre-fetched data representing data objects predicted to be displayed soon, even if these data objects were not recently displayed.

In some embodiments, the cache controller 1720 implements a "purging policy" (or "replacement policy") for the data cache 1710. The purging policy determines which cached data are purged to create cache space for newly fetched data. As with any cache, an effective purging policy can improve the performance of the cache (and the related performance of the system) by retaining data that are likely to be requested soon and purging data that are less likely to be requested soon. Any suitable purging policy may be used, including, without limitation, a least-recently used (LRU) purging policy, a first-in-first-out (FIFO) purging policy etc.

In some embodiments, the purging policy identifies the data to be purged based, at least in part, on the user's navigation of the timelines. For example, when the user interacts with the user interface by scrolling the timelines from left-to-right (e.g., from an earlier time period to a later time period), data representing data objects tagged with times that are earlier than the earliest displayed time may be purged. Optionally, data representing data objects tagged with times that are earlier than the earliest displayed time but fall within a backward-in-time buffer period relative to the earliest displayed time may be retained. When the user interacts with the user interface by scrolling the timelines from right-to-left (e.g., from a later time period to an earlier time period), data representing data objects tagged with times that are later than the latest displayed time may be purged. Optionally, data representing data objects tagged with times that are later than the latest displayed time but fall within a forward-in-time buffer period relative to the latest displayed time may be retained.

As another example, when the user has been viewing the same time period for longer than a specified amount of time, data representing data objects tagged with times that are earlier than the backward-in-time buffer time period or later than the forward-in-time buffer time period may be purged. When the user interacts with the user interface by zooming in, data representing data objects tagged with times that are earlier than the backward-in-time buffer time period or later than the forward-in-time buffer time period may be purged. When the user interacts with the user interface by zooming out, data representing lower layers of the displayed objects' payload data may be purged.

In some embodiments, the pre-fetching engine 1730 predicts which data packages, time periods, data objects, and/or data object layers are most likely to be displayed soon, and pre-fetches the corresponding data. The pre-fetching engine 1730 may use heuristic rules that embody predictions as to which data packages, time periods, data objects, and/or data object layers are most likely to be displayed soon. For example:

(1) When the user interacts with the user interface by selecting graphic items on timelines, tracing a path from left-to-right (e.g., from graphic items representing data objects tagged with earlier times to graphic items representing data objects tagged with later times), the pre-fetching engine may pre-fetch data representing data objects tagged with times after the end of the displayed time period.

(2) When the user interacts with the user interface by selecting graphic items on timelines, tracing a path from right-to-left (e.g., from graphic items representing data objects tagged with later times to graphic items representing data objects tagged with earlier times), the pre-fetching engine may pre-fetch data representing data objects tagged with times before the start of the displayed time period.

(3) When the user interacts with the user interface by scrolling the timelines from left-to-right, the pre-fetching engine may pre-fetch data representing data objects tagged with times after the end of the displayed time period.

(4) When the user interacts with the user interface by scrolling the timelines from right-to-left, the pre-fetching engine may pre-fetch data representing data objects tagged with times before the end of the displayed time period.

(5) When the user has been viewing the same time period for longer than a specified amount of time, the pre-fetching engine may pre-fetch data representing data objects tagged with times outside and adjacent to the displayed time period.

(6) When the user interacts with user interface by shifting the focus to a particular graphic item (e.g., hovering the mouse pointer over the graphic item), and the graphic item represents data from payload layer $L_K$ of the payload data of the corresponding data object(s), the pre-fetching engine may pre-fetch data representing payload layer $L_{K+1}$ for the graphic item and/or adjacent graphic items.

(7) When the user interacts with the user interface by zooming out (e.g., adjusting the timelines to display a time period of greater duration than the previously-displayed time period), the pre-fetching engine may pre-fetch data representing data objects tagged with times outside and adjacent to the displayed time period. If the currently-displayed graphic items represent data from payload layer $L_K$ of the data objects' payload data, the pre-fetching engine may pre-fetch data representing payload layer $L_K$ or $L_{K+1}$ for the adjacent objects.

(8) When the user interacts with the user interface by zooming in (e.g., adjusting the timelines to display a time period of greater duration than the previously-displayed time period), and the currently-displayed graphic items represent data from payload layer $L_K$ of the data objects' payload data, the pre-fetching engine may pre-fetch data representing payload layer $L_{K+1}$ (or, optionally, a lower layer) for the currently displayed graphic items.

(9) When the user interacts with the user interface by unfolding the portion of an origami that includes links to related data packages, the pre-fetching engine may pre-fetch data representing data objects from the most relevant data package(s). The pre-fetch engine can limit the pre-fetching to data representing particular layers of the payload data (e.g., layers representing the data objects at a high level of abstraction) and/or to data representing data objects tagged with particular times (e.g., times within the same time period currently displayed on the timelines).

The pre-fetching engine may use one or more parameters or criteria to control the amount of data pre-fetched, the type of data pre-fetched, etc. For example, regarding the amount of data pre-fetched:

(1) The pre-fetching engine can request data representing all data objects tagged with times within a specified time period.

(2) The pre-fetching engine may determine the length of the time period for which data is pre-fetched based on the rate at which the user is tracing a path across the timelines, scrolling the timelines, or zooming the timelines, such that the data representing a given data object is predicted to be stored in the pre-fetch cache before the user navigates to the portion of the timeline which includes that data object.

(3) The pre-fetching engine can pre-fetch more data for higher-ranked timelines and less data for lower-ranked timelines. For example, the pre-fetch engine can request lower layers of payload data for the higher-ranked timelines and higher layers of payload data for the lower-ranked timelines. As another example, the pre-fetch engine can request data representing data objects tagged with times within longer time periods for higher-ranked timelines, and data representing data objects tagged with times within shorter time periods for lower-ranked timelines (4) The pre-fetching engine can use filtration criteria to limit the amount of data pre-fetched. For example, the pre-fetching engine's request can specify any filtration criteria provided by the user, and the server can respond by sending only data corresponding to data objects that satisfy the specified criteria. Alternatively, the server can send data corresponding to data objects without regards to any filtration criteria, and the pre-fetching engine can apply the filtration criteria to filter out data that don't match the criteria rather than caching such data.

Regarding the type of data pre-fetched:

(1) In some embodiments, the server sends the data objects, portions thereof, or data derived from the data objects to the pre-fetching engine, and the user interface uses the pre-fetched data (as appropriate) to generate graphic items dynamically. In such embodiments, the pre-fetched data representing a data object may include the data object's time tag and all the data object's payload data or a portion thereof (e.g., a layer of the payload data).

(2) In some embodiments, the server constructs the graphic items and sends them to pre-fetching engine, which stores the pre-fetched graphic items in the data cache. This technique can reduce the amount of data transmitted across the network, because only graphic items that are likely to be displayed are pre-fetched. To facilitate construction of the graphic items, the pre-fetching engine may notify the server of the client's user interface parameters (e.g., the width of the user interface, the duration of the time period represented by the displayed portions of the timelines, etc.), so the server can determine when to construct cluster-type graphic items representing two or more data objects, which data objects to associate with a particular cluster-type graphic item, when to construct object-type graphic items representing a single data object, what form of object-type graphic item to construct for a particular data object, etc.

(3) In some embodiments, when initiating a pre-fetching operation, the pre-fetching engine's request can indicate whether the server should (1) construct the clusters/origamis (and if so, what level of clustering or folding to implement) or (2) send portions of the data objects and/or data derived from the data objects (and if so, which portions of the data object and/or which derived data). In some embodiments, the pre-fetching engine make these determinations based on the observed pattern of user scrolling and zooming operations. For example, if the user is zooming in and out and scrolling back and forth within a particular time period, the pre-fetching engine may request the full data for the time period and cache it locally, to avoid continual retransmission of the same data. As another example, if the user is scrolling quickly in one direction, the pre-fetching engine request the corresponding graphic items, to avoid unnecessary transmission of more data. As another example, if the user is scrolling at a particular zoom level, the pre-fetching engine may request graphic items or data object payload data consistent with that zoom level, to avoid unnecessary transmission of more data.

In some embodiments, the data aggregator 1740 performs read coalescing on data pre-fetching requests and/or data fetching requests to reduce duplicate transmission of the same data by the server. For example:

(1) If multiple devices on the same local network are generating requests to fetch the same data (e.g., overlapping data in the same data package, the same data referenced in multiple data packages, etc.), such requests may be coalesced.

(2) If a single user device is running multiple instances of the user interface which are generating requests to fetch the same data (e.g., overlapping data in the same data package, the same data referenced in multiple data packages, etc.), such requests may be coalesced.

(3) If a single instance of the user interface is generating multiple requests to fetch the same data (e.g., overlapping data in the same data package), such requests may be coalesced. This scenario may arise if the user is rapidly zooming in and out or scrolling left and right, such that the pre-fetching engine generates multiple requests for the same data or overlapping data in rapid succession.

Figure 18:
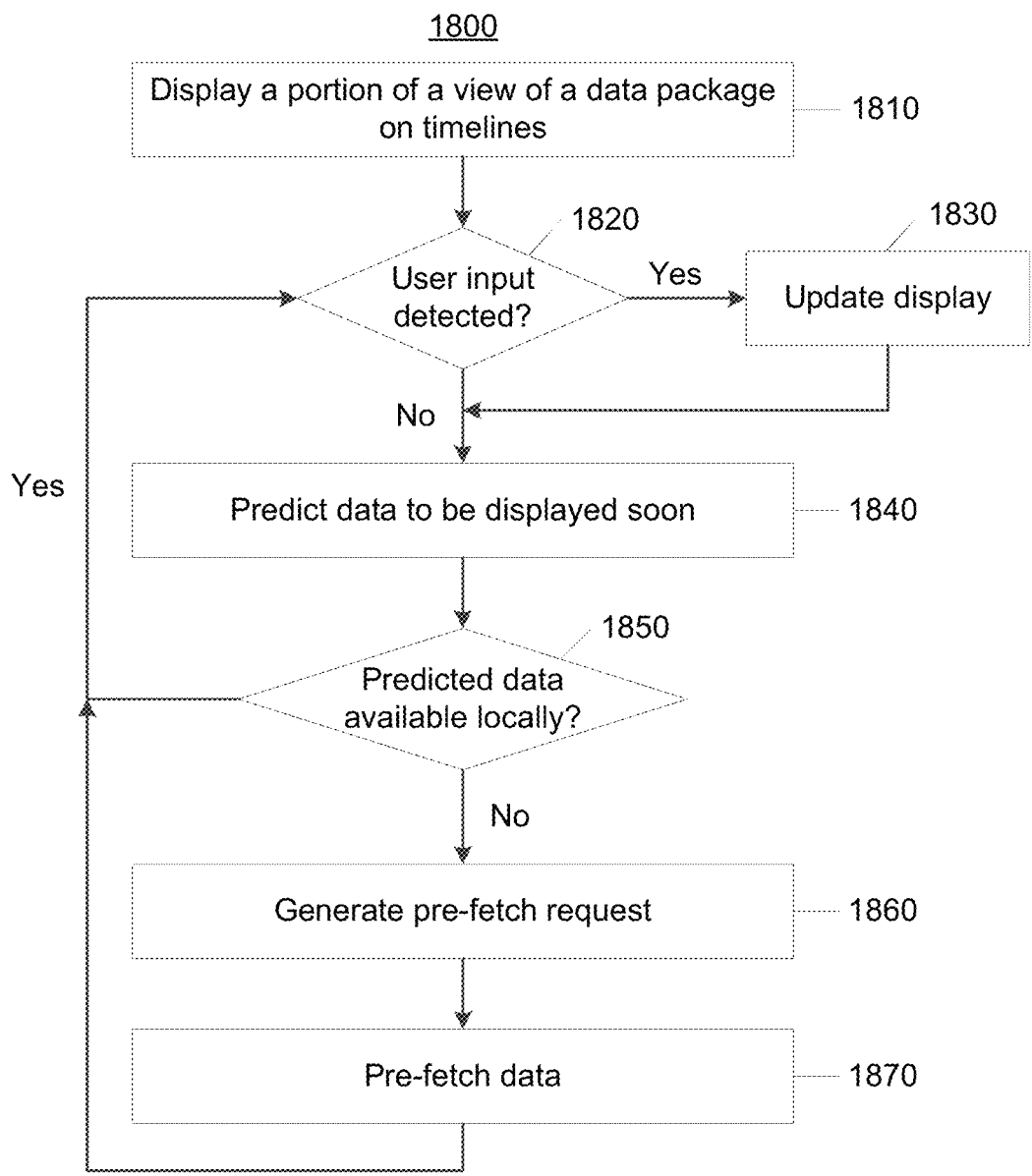
FIG. 18 is a flowchart of a method for displaying views of data packages, according to some embodiments.

FIG. 18 shows a flowchart of a method 1800 for displaying views of data packages, according to some embodiments. The method 1800 may be performed, for example, by the device (e.g., client device) that displays the user interface 1600. In some embodiments, portions of the displayed data are pre-fetched prior to being requested by the user interface.

In step 1810, the user interface displays at least a portion of a view of one or more data packages on the timelines.

In step 1820, the device determines whether user input to the user interface 1600 has been provided. Some examples of user input may include input indicative of scrolling the timelines, zooming in on the timelines, zooming out on the timelines, selecting a cluster-type graphic item, selecting an object-type graphic item, selecting an affordance representing a data package, etc.

If user input is detected, then the user interface is updated based on the user input at step 1830. Updating the user interface may include displaying the portions of the timelines representing the time period indicated by the user's input, and displaying the graphic items representing data objects tagged with times in the newly-displayed portions of the specified time period. If data representing such graphic items are available locally (e.g., in the data cache 1710), this data may be used to update the user interface quickly, thereby reducing or eliminating any user-perceptible delay. If data representing such data objects are available locally (e.g., in the data cache 1710), this data may be used to generate such graphic items and update the user interface quickly, thereby reducing or eliminating any user-perceptible delay. If neither the data representing such graphic items nor the data representing such data objects are available locally, such data may be fetched, and graphic items representing such data objects may be generated. In addition, determinations regarding creation, merging, fragmenting, and destruction of cluster-type graphic items may be made, and determinations regarding folding and unfolding of graphic items may be made.

In step 1840, the pre-fetching engine 1730 predicts which time periods, graphic items, data objects, payload layers, and/or data packages are likely to be displayed soon. Such predictions may be based, for example, on user input and/or on the current status of the user interface (e.g., which data package(s) are currently being displayed, which view of the data package(s) is currently being displayed, which time periods are currently being displayed, which data objects are currently being displayed, which layers of the data objects are currently being displayed, etc.). Some examples of techniques for making such predictions are described above.

In step 1850, the pre-fetching engine 1730 determines whether the data that are predicted to be displayed soon are already available locally (e.g., stored in the data cache 1710). If not, at step 1860, the pre-fetching engine 1730 generates a pre-fetching request to request the data that are predicted to be displayed soon and are not available locally. Also at step 1860, if appropriate, the data aggregator 1740 performs read coalescing on pending pre-fetching requests (and, optionally, on fetching requests).

In step 1870, the pre-fetching request is sent and the requested data are received. (The receipt of the requested data may be asynchronous with respect to the steps illustrated in FIG. 18.) When the requested data are received, the pre-fetched data are stored in the data cache 1710. If there is not already sufficient space in the data cache for the pre-fetched data, other data are purged from the data cache according to the purging policy to make space for the pre-fetched data.

Spheres

A sphere is a data structure or package that identifies data objects (e.g., using memory pointers or other identifiers), contains data objects, or both, and is associated with content rules and access rules. Spheres can be assigned names. As described above, a data object is tagged with an associated time and can represent different types of content, such as a social network post, an electronic mail message, a text message, a micro blog message, an image, an electronic file, and other types of messages. The data objects can be obtained from a variety of different sources such as, for example, social networks, messaging systems such as electronic mail and instant messaging, and so on. The data sources and the data objects obtained from the data sources are specified by one or more content rules associated with a data package. One or more access rules associated with a data package specify which users are members of the sphere and what privileges they have to view and modify data objects of the sphere. Spheres and their associated content rules and access rules can be stored in database 124 of the system 100. Sphere data objects generated within the system can be stored in database 124 and sphere data objects obtained from external sources can be stored in external database 126.

Figure 7:
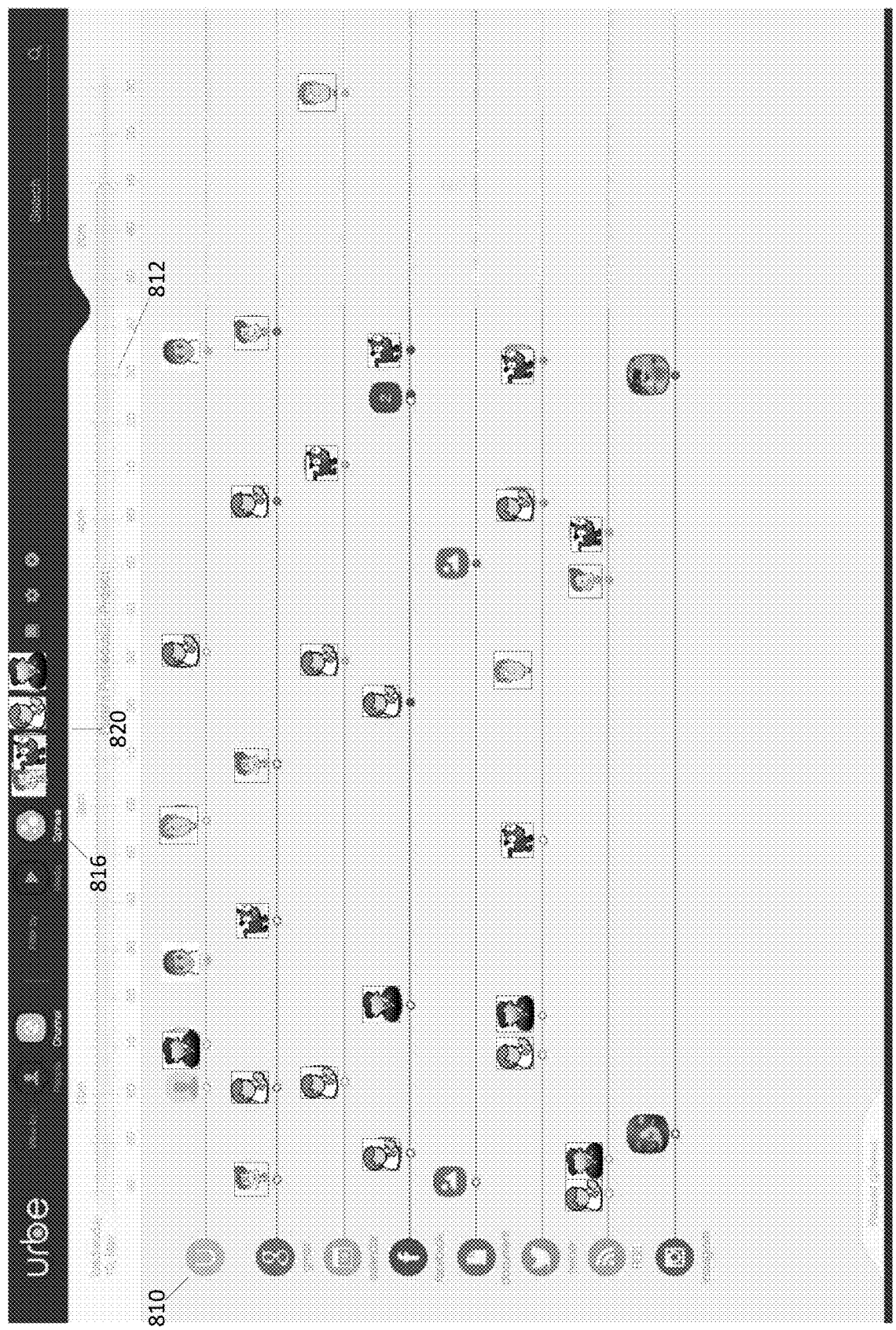
FIG. 7 shows an example screen shot of a view of a "sphere" on timelines.

FIG. 7 shows an example screen shot of a view of a "sphere". An icon 816 representing the sphere appears in the screen shot. Selection of the icon 816 causes the data objects of the sphere to be presented on the timelines 810. The timelines 810 are updated dynamically as data objects become available to the sphere. Different sphere members can see their timelines being updated at generally the same time. Each data object is presented on the timeline corresponding to its data source and at a position corresponding to the time associated with the data object. The view from within a sphere differs in certain respects from the general timeline view already described above. Most importantly, only those data objects that are defined as existing within the sphere can be visible on the timeline. The time interval of the sphere is visible inside the timeline directly below the menu bar 812. If the sphere has a preset duration, the expiration time may be indicated in the future part of the timeline. Expired spheres can remain in the timelines of those who joined them, although their content can no longer be added or changed. Otherwise, the time boundaries of the sphere are defined as the time that the first and last items of content were added to it.

Spheres and their contents can be shared with one or more other users of the system 100. Each user with whom the sphere is shared will see the sphere on their own timeline, can have access to and be able to modify and possibly add to its contents, and can pass direct messages to other members of the sphere using the proprietary messaging of the system 100. In the simplest content sharing model, all sphere members have the power to see all content added to the sphere from all sphere members. Socialized sharing of content on a timeline enables certain activities to be casually performed that otherwise would be inordinately time-consuming: for example, sharing photo and video clips taken at a single event and recorded by many people, and quickly reconstructing in proper time sequence a montage of the event.

Optionally, a row of icons within the menu bar 820 indicates in rank order the few most important contributors to the sphere (either by items of content contributed, or file sizes, or popularity, or other criteria). Selecting one of the icons will highlight on the timeline the content belonging to the person associated with the icon. The Urbe I.D.s of other members of the sphere can be accessed through a pulldown menu or other list. Other screen properties, such as background colors or wallpapers, may also be set automatically or chosen by the user to distinguish the interior of a given sphere from other spheres or from the general timeline.

Figure 8:
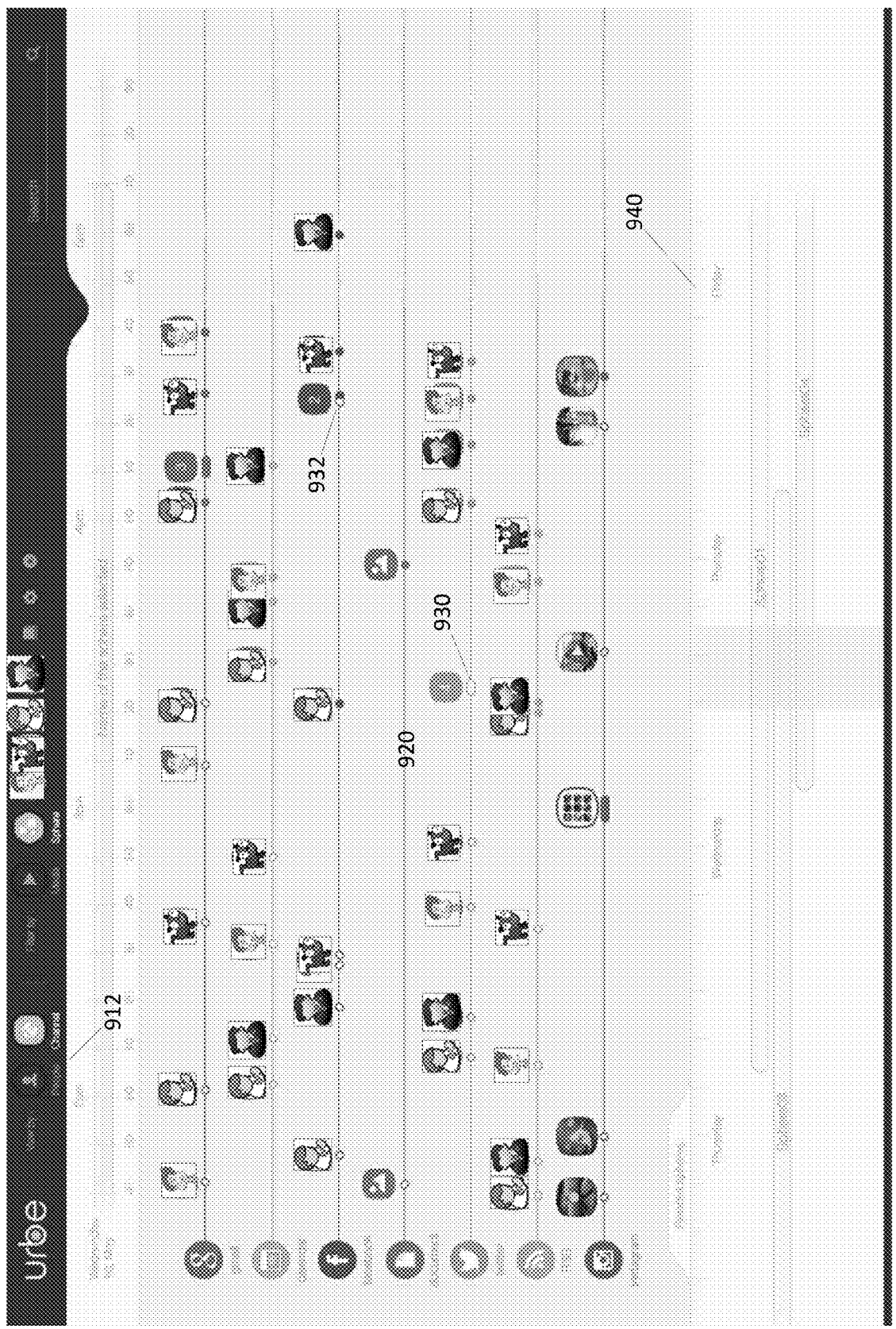
FIG. 8 shows an example screen shot of multiple spheres presented on a lower timeline at higher elevation.
Figure 9:
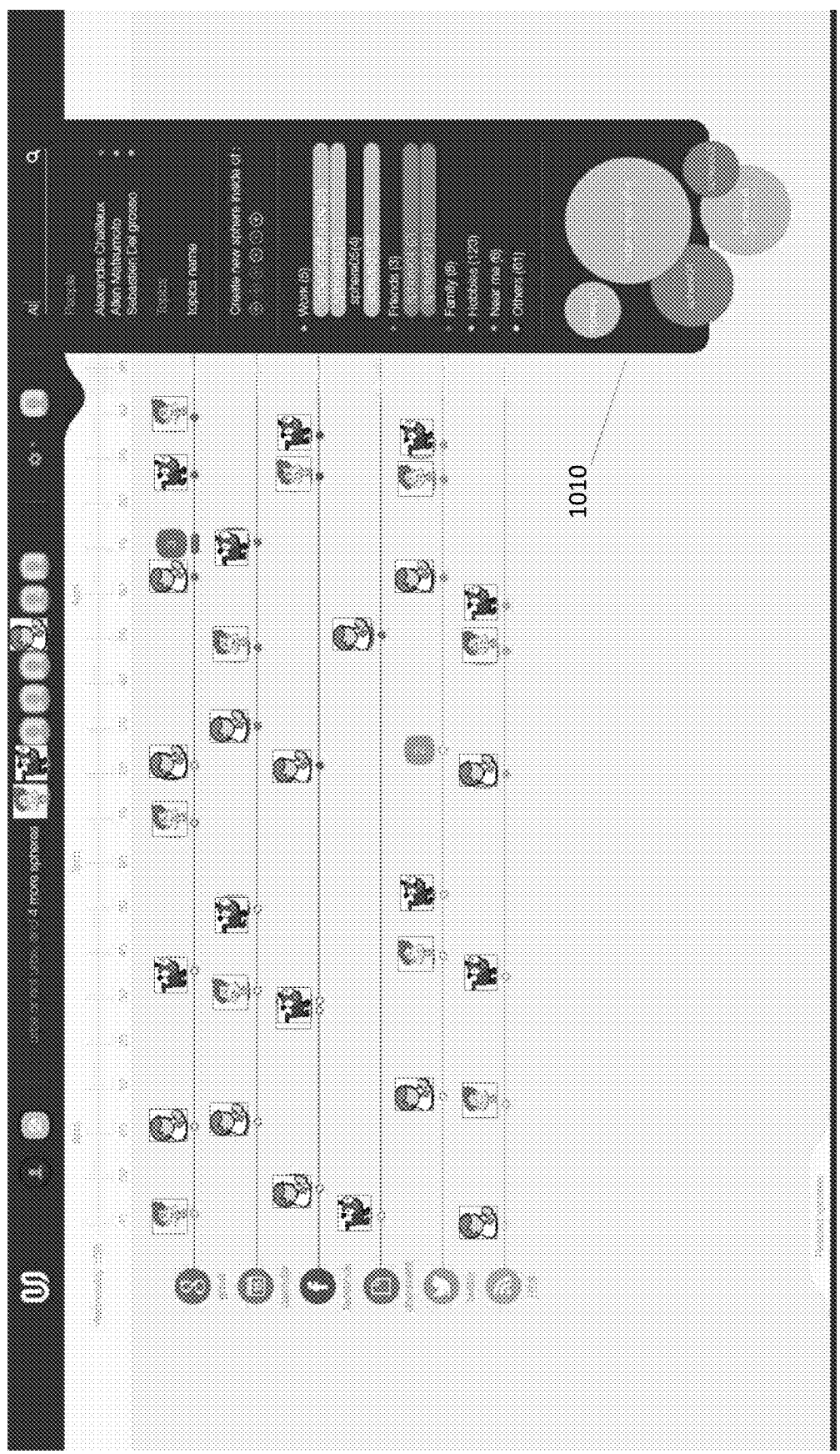
FIG. 9 is an example screen shot showing a "foam panel" for navigation.

FIG. 8 shows an example screen shot of multiple spheres presented on a lower timeline at higher elevation. Navigation between spheres can take place through several possible methods. A drop down menu, for example, accessible from a button on the top menu bar or through activating the search window, can enable the user to select between existing spheres by name. Alternately, spheres can be viewed in a timeline panel below the main timeline 940 (FIG. 9), whose time extent encompasses all the user's existing spheres. Each sphere can be represented by a labelled bar of length matching the starting and ending point of the sphere. In yet another alternative, spheres can be represented within a menu bar or drop-in panel as circles of varying sizes (determined by activity in the sphere), colors (set by the user to correspond to different major groupings of spheres), and vertical positions (corresponding to the recency of the last added content) 1010. Different various sphere navigation methods may be implemented on different types of screens and input devices. Selecting a sphere through any of these methods can trigger an animation that changes the visible time range of the main timeline to match that of the sphere.

A sphere can persist indefinitely or can expire after a preset time period or upon a condition being satisfied. A condition for expiration of a sphere can specify a Boolean expression that, when it evaluates to true, can cause the sphere to expire. The Boolean expression can specify attributes of the sphere and its members. For example, when the sphere's membership falls below a certain count, or when a particular member leaves the sphere, the sphere can terminate. As another example, if there has been no new data objects added to the sphere after a predetermined time period the sphere can expire. Other conditions are possible.

Figure 10:
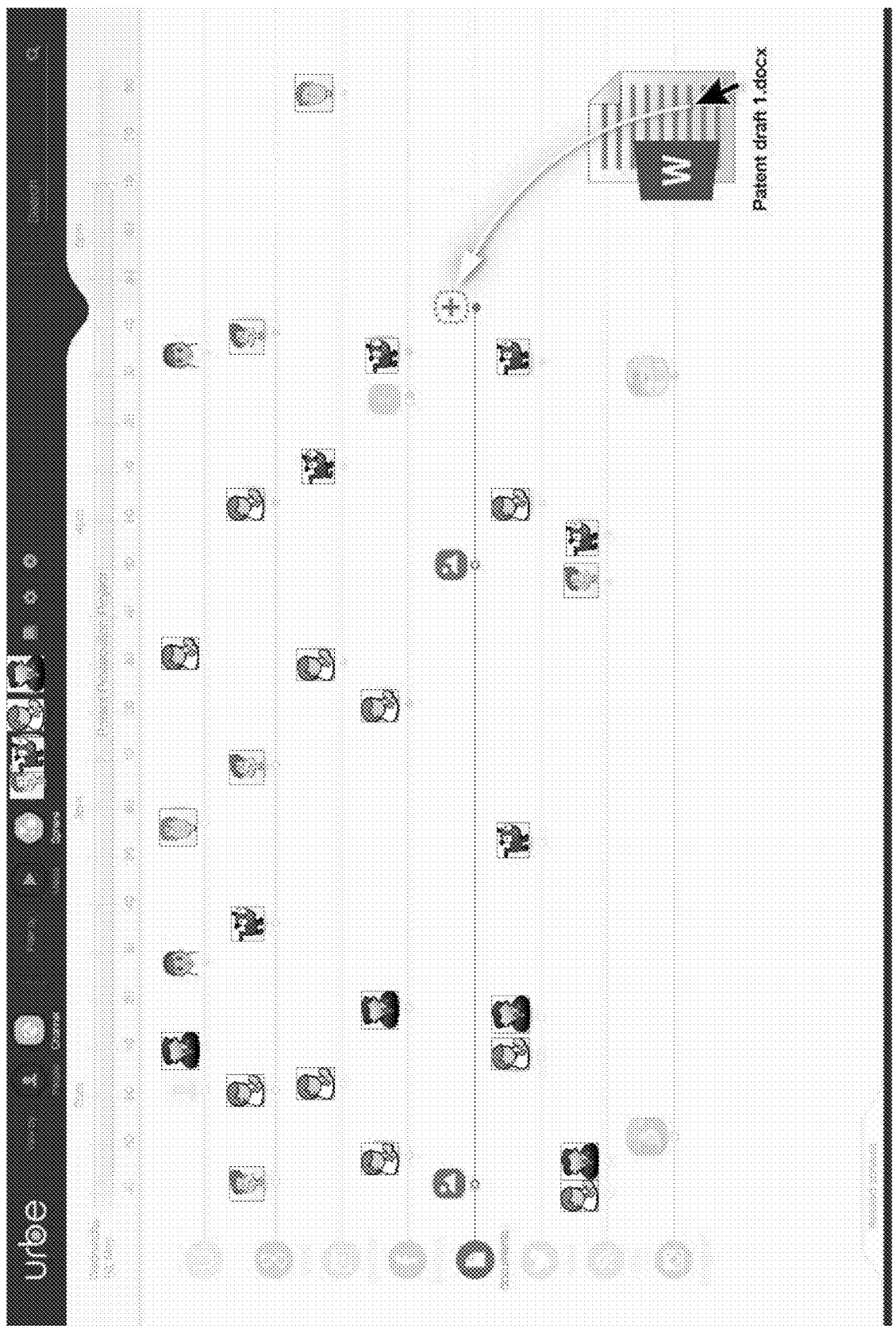
FIG. 10 is an example screen shot showing "drag and drop" functionality.
Figure 11:
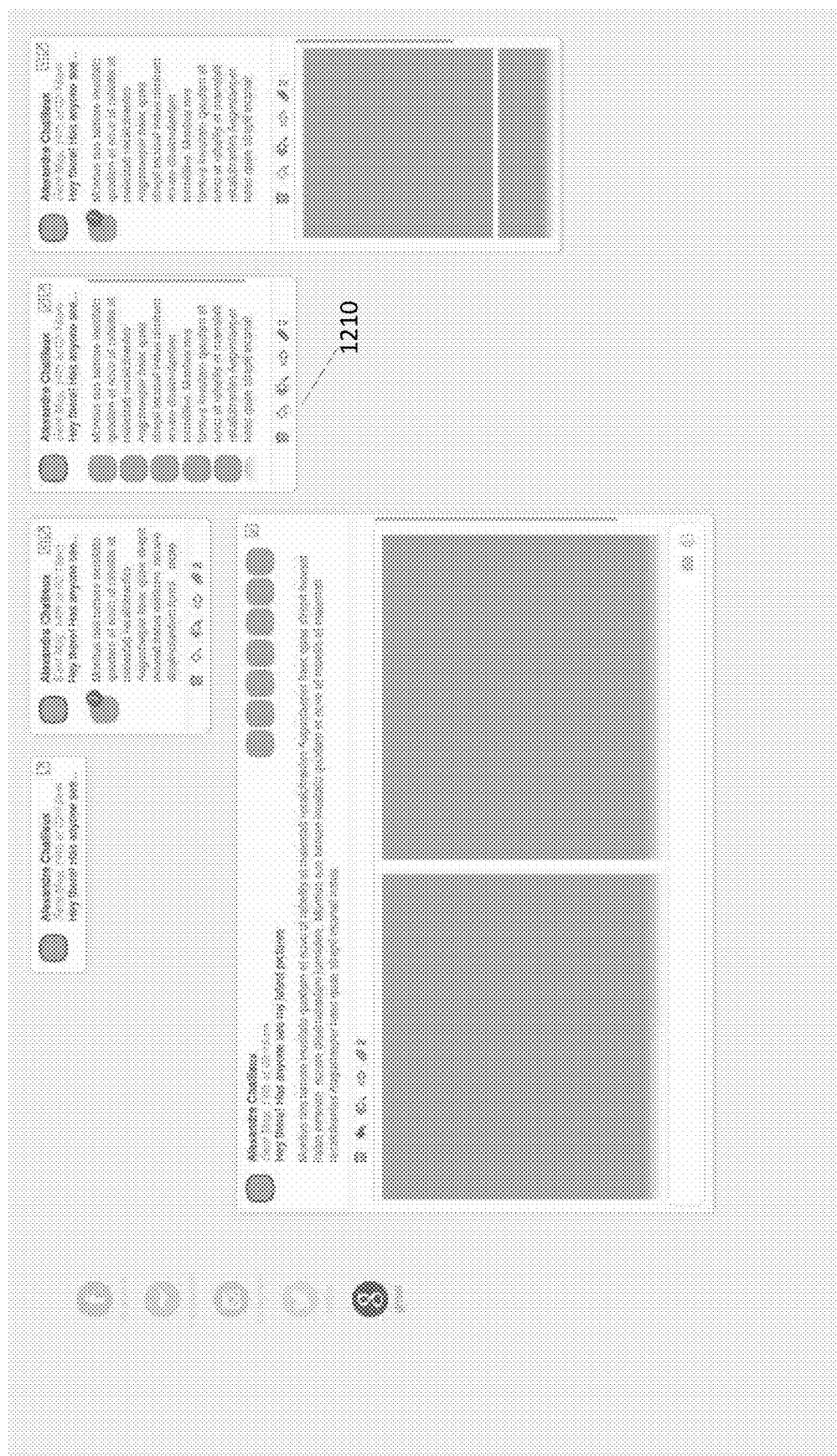
FIG. 11 shows an example of an origami in several different states of unfolding.
Figure 12:
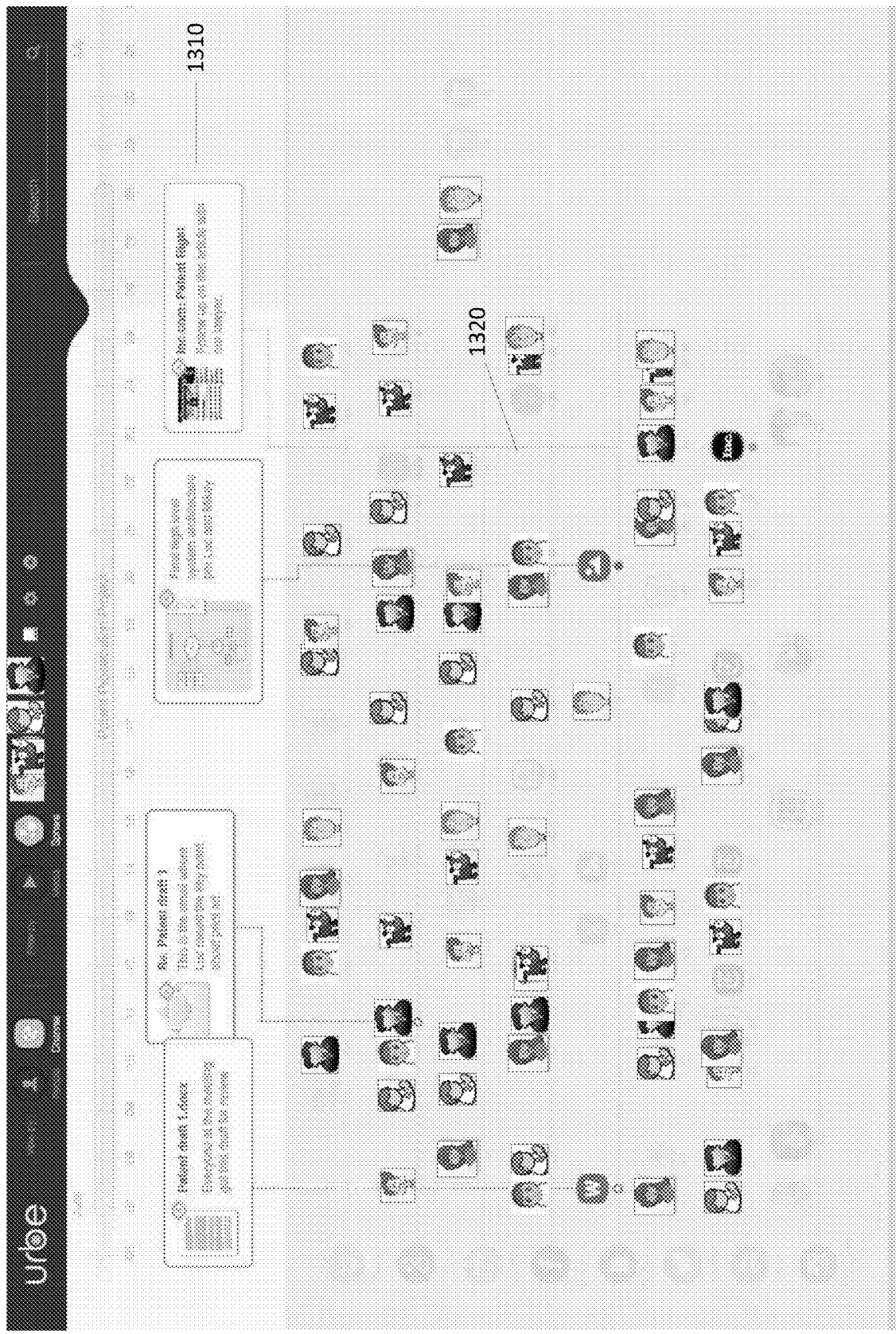
FIG. 12 is an example screen shot showing an "annotation line".
Figure 13:
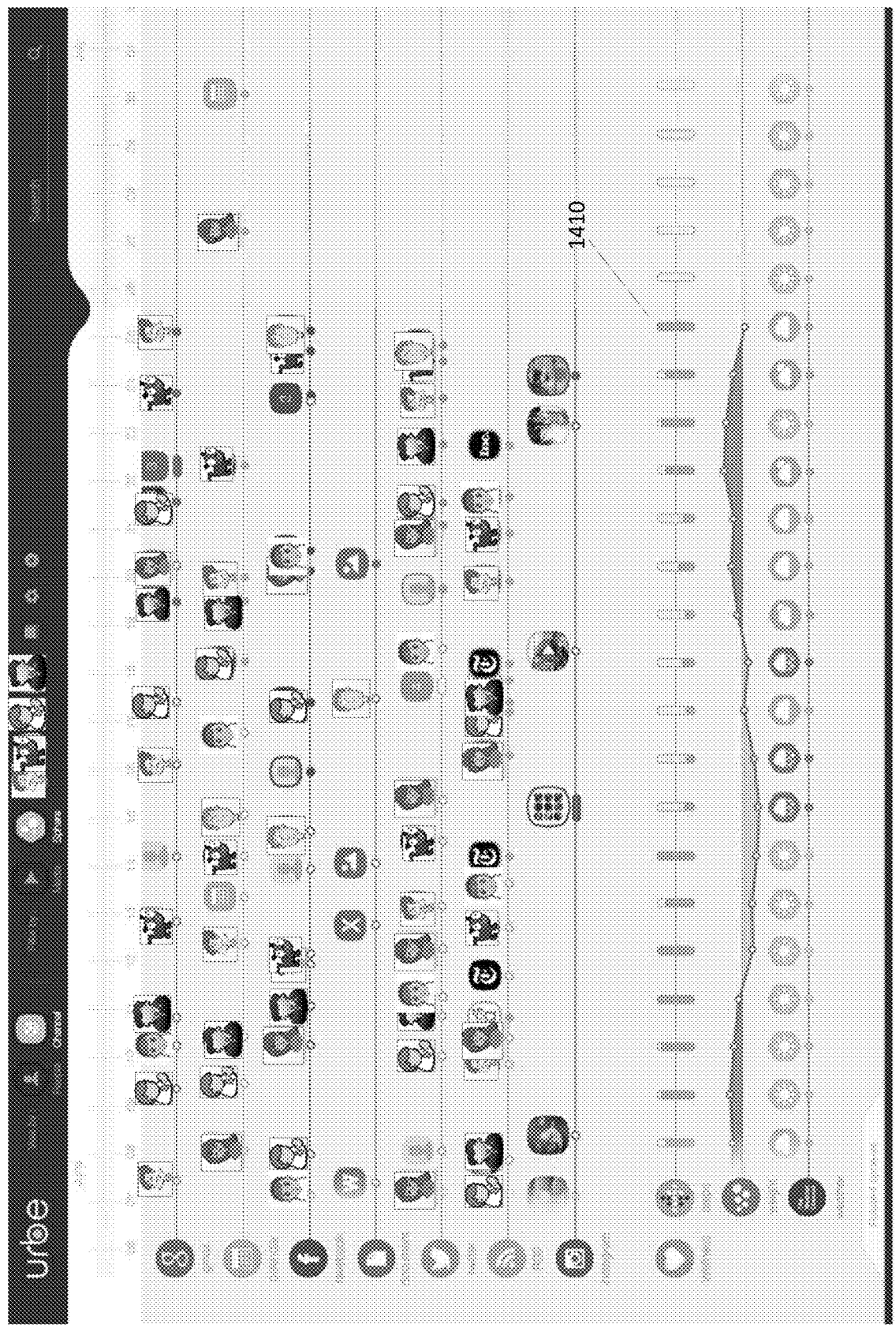
FIG. 13 is an example screen shot showing a possible representation of quantitative data.
Figure 14:
FIG. 14 shows an example screen shot of a "super-feed" on a mobile phone.

Content can be added to spheres both automatically using content rules and by user-initiated action. User-initiated additions to a sphere may include dragging a file or file icon from the desktop or timeline into an area of the timeline associated with the sphere as is shown in FIG. 10. A confirmation window may optionally be added, so that users are reminded that the content may be visible to others. Users may be given the option of excluding from a given sphere a given data channel, so that, for example, personal communications are not inadvertently shared with a broader than intended group.

Generally, a sphere content rule specifies a data source and optionally specifies one or more criteria that are used to filter content obtained from the data source. By way of illustration, a content rule can specify a data source of a social network and one or more criteria for obtaining content from that social network. The data source of a content rule can also specify a user account from which obtain content from the data source. For instance, the data source can specify the Facebook social network and the user account of Bob. The criteria can specify what type of data objects to obtain such as messages, email messages, posts, a micro blog messages, electronic mail messages, a text messages, images, electronic files, or combinations of these. The criteria can further filter the obtained data objects according to topic, subject, or keywords in a hash tag. Data objects that do not satisfy the criteria can be discarded. To obtain content using a content rule, the core API server 110 uses workers 130 to retrieve data objects from data sources specified by content rules and then discards any of the obtained data objects that do not meet the criteria specified by content rules.

Generally, a sphere access rule specifies which users are members of a sphere. An access rule can specify membership by identifying users explicitly and/or by specifying users using criteria such as user group membership, characteristics of content generated by the user (e.g., topics or subject matter of social network posts), demographic characteristics, place of employment, department, common interests, etc. For example, a business wishing to advertise goods or services may define access rules for its sphere; say, that users have positively mentioned the business at some point within a specific time frame in a social network post. Having met the criteria specified by the access rules, users become eligible to join the sphere, within which the sphere owner has provided product information, time-sensitive special offers, or other promotional material on the file sharing channel, and within which users and business representatives can enter into dialogue via the internal messaging service. This offers to businesses a model of customer relationship in which businesses are able to connect with particular market segments, while users are incentivized to promote or engage with products in order to meet the eligibility requirements to enter the sphere to access the special offers or other information that they contain.

In addition to identifying members of a sphere, access rules can also specify privileges that dictate access to data objects of the sphere. In some implementations, a privilege can specify whether a user has read access, write access, and/or administrative privileges. The read access privilege allows a user to view data objects but not add or remove data objects to a sphere. The write access privilege allows users to both view and write data objects to a sphere. The administrative privilege allows users to view and modify the content and access rules of a given sphere. In some implementations, an access privilege can be active for a given time period (such as working hours), or the access privileges can be active when a given member is in a specific geographic location, or both.

While data spheres can be created manually, in some implementations spheres can be created automatically. If two or more users are members of a common social network and share one or more interests (based on the topics or subjects of the users' social network posts), a new sphere can be created with the users as members. The new sphere's content rules can specify that content generated by any of the members is to be included as data objects of the sphere. A content rule for the new sphere can specify criteria to filter out data objects not related to topics or subjects the members have in common.

Spheres can be used to verify the integrity and authorship of the content they contain, either in the case of sole authorship or where multiple people are involved in the creation of content. In some implementations, this can be done by serializing the data objects of the sphere and then hashing the serialized version. The hash can be stored with an online time-stamping service or as an address on the Bitcoin blockchain or other trusted ledger. In any case, a file snapshot of the sphere's contents can also be saved to prove that the data produces the correct hash. The system can optionally provide a service to create the file snapshot, and the system's proprietary data channel provides a convenient location to save the snapshot. Alternately, the hash and its related data snapshot can be written to the blockchain and archived separately, respectively, for a fee.

Users can invite other users to join the sphere. Different sphere membership management models can be implemented by the method. In the simplest sphere management model, the creator of the sphere retains full control of sphere membership and has the sole power to invite or exclude others users from the sphere, as well as sole power to disband the sphere. Invitations can take place by dedicated message or, potentially by utilizing near field communication capabilities of smart devices, to enable personal invitations to a sphere to be accepted by, for example, bumping phones. Invited members can leave a sphere at any time. The "creator invites" model may be particularly useful in social or business applications where a relatively small number of individuals need to share messages, emails, files, and/or other content over a relatively defined period of time.

In a second sphere management model, invited participants in a sphere also have the power to invite others to join. Since this "anyone invites" model introduces a potential viral growth scenario, with no upper limit to the number of members, each sphere member also has the ability to selectively block or mute content from other sphere members. Selective blocking can either be performed on a case-by-case basis or through an up-voting mechanism applied to content posted by other sphere members, in which an up-vote threshold can be established above which content posted by other sphere members will be made visible to the user.

In a third sphere management model, a sphere creator is able to issue general invitations, for example by including a specific hyperlink in a social media post, which anyone with access to the hyperlink can follow to join the sphere. Such general invitations may be appropriate, for example, for non-exclusive chat rooms as are available on other services. In such spheres a mechanism for selective blocking or muting of users will be useful. In such spheres an optional approval mechanism for new members may be implemented in which existing sphere members cast votes on whether to include potential new members.

In some implementations, two or more spheres can be automatically combined into a single sphere based on a commonality between the data objects of the spheres, the membership of the spheres, or both. Data objects of the spheres can have keywords, hashtags, topics or other information in common. For example, if the over-riding topic in data objects for two spheres concerns a particular sports team, the data objects of the spheres can be combined into a new sphere. Likewise, if members of two spheres share common interests as evidenced by content the members generate, the spheres can be combined. Other ways of combining spheres are possible.

Figure 21:
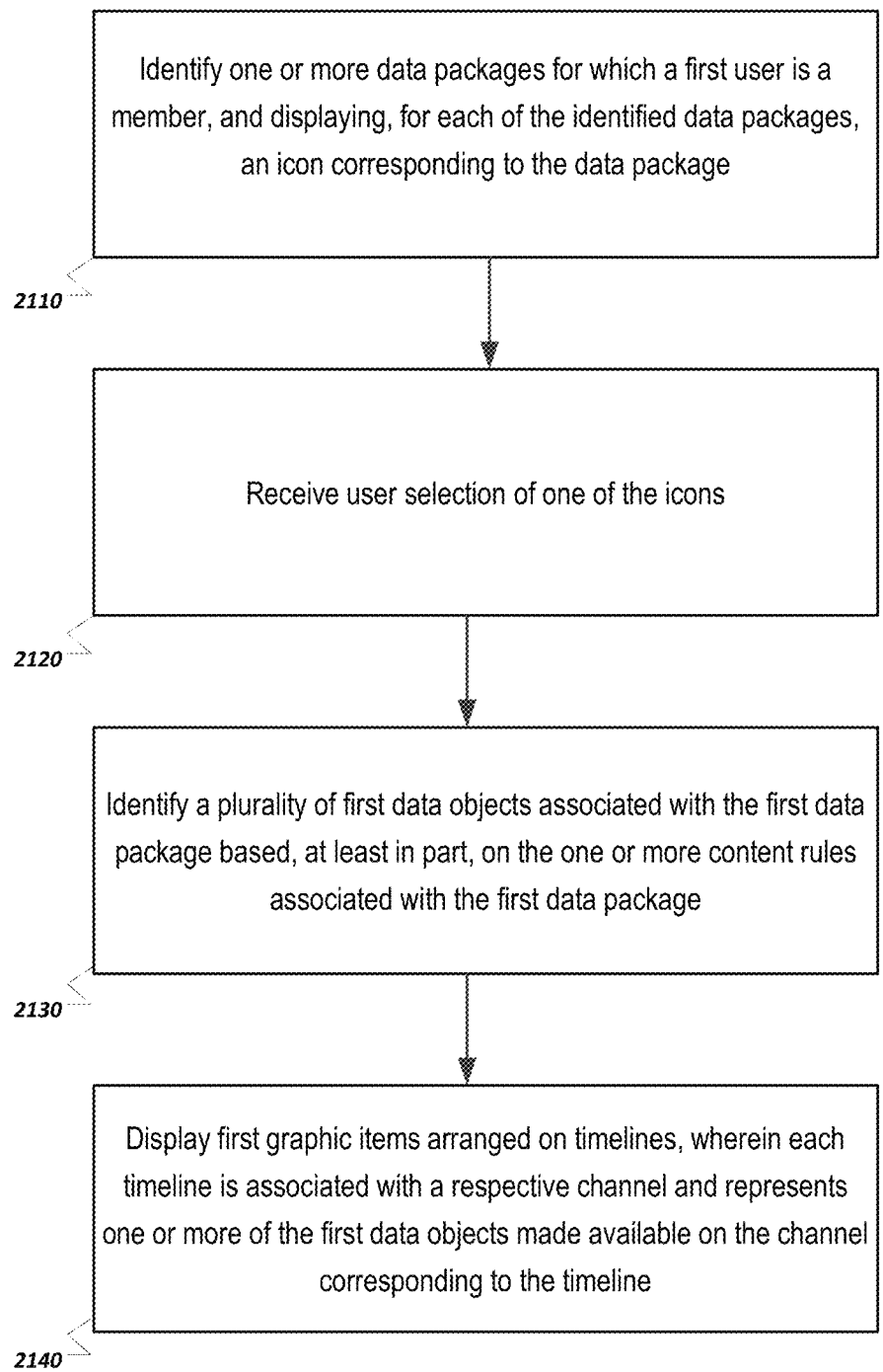
FIG. 21 depicts a flow chart of an example method for processing a sphere.

FIG. 21 depicts a flow chart of an example method for processing a sphere. The computer-implemented steps indicated below can be performed by the core API server 110, for example. The method begins with identifying one or more data packages for which a first user is a member, and displaying, for each of the identified data packages, an icon corresponding to the data package, wherein each data package is associated with one or more content rules that define content of the data package (step 2110). Next, selection of one of the icons by the first users is received (step 2120). A plurality of first data objects associated with the first data package is then identified based, at least in part, on the one or more content rules associated with the first data package, wherein each identified first data object is associated with a respective source channel of a plurality of different channels, and is associated with a respective time the first data object was made available on the associated channel, wherein at least two of the channels correspond to different third-party communication applications (step 2130). First graphic items are then displayed on timelines wherein each timeline is associated with a respective channel (step 2140). Each first graphic item displayed on a respective timeline represents one or more of the first data objects made available on the channel corresponding to the timeline and each first graphic item is displayed on the respective timeline at a position on the timeline corresponding to the one or more times associated with the first data objects represented by the first graphic item.

An Example Implementation

Figure 1:
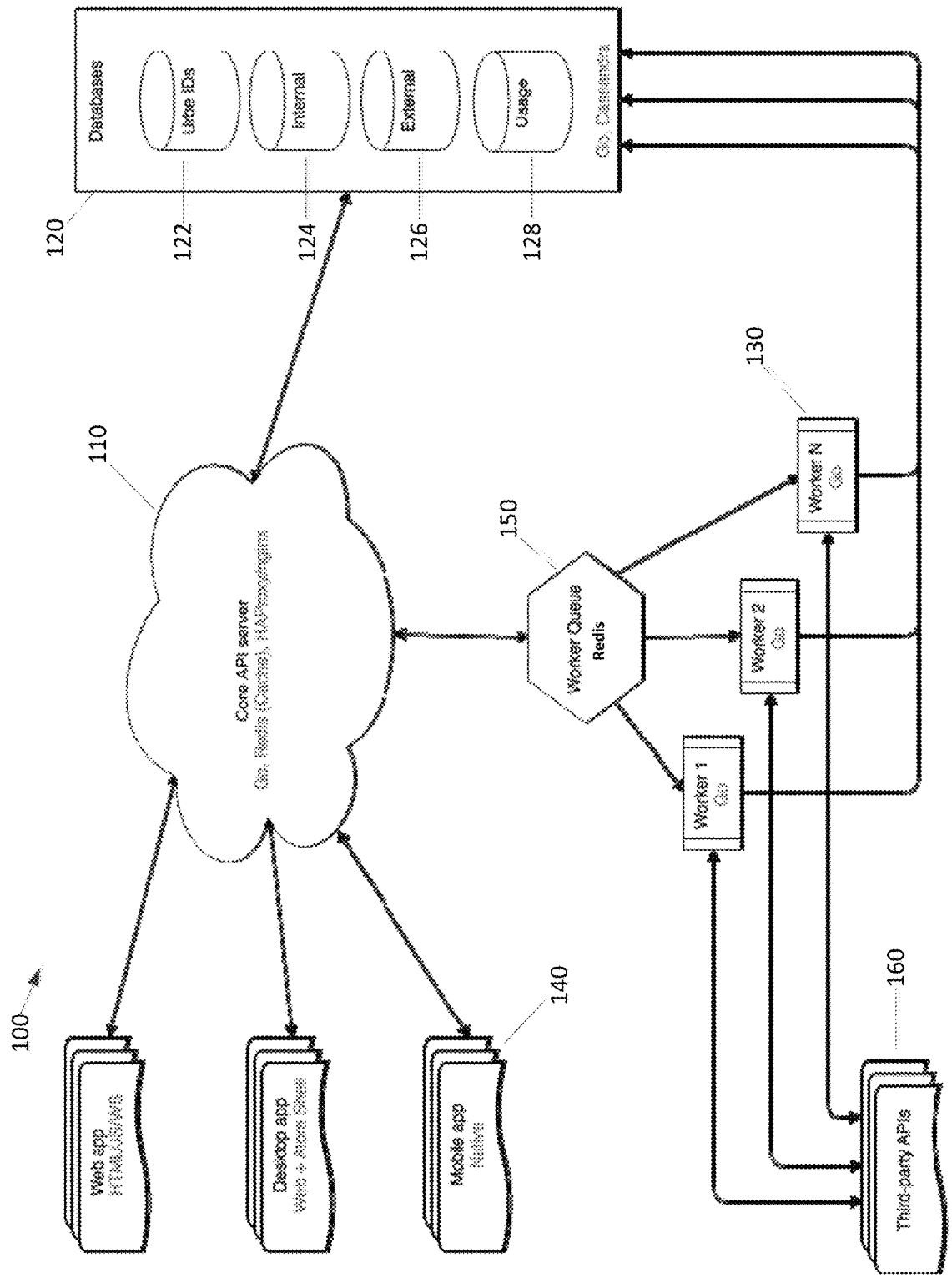
FIG. 1 shows an example system architecture configuration including multiple virtual machine instances.

FIG. 1 shows an example system architecture including multiple virtual machine instances. Specific languages and technologies used in one possible implementation are listed below the component labels and are not intended to be taken in a limiting sense. The system 100 provides communication management, data retrieval and storage, and data rendering functionality. The system 100 comprises software components and databases that can be deployed at one or more data centers in one or more geographic locations, for example. The system 100 software components comprise a core application program interface (API) server 110, a worker queue 130, worker nodes 150, and client interfaces 140. The software components can comprise subcomponents that can execute on the same or on different individual data processing apparatuses. The system databases 120 comprise a person identification (Urbe ID) database 122, an "user generated database" 124 comprising user-generated data internal to the system, an "external services database" 126 comprising synchronized data extracted from third party services in accordance with their terms of service, and a user usage database 128. The databases can reside in one or more physical storage systems. The software components and data will be further described below.

The core API server 110 is a software component that updates the user ID database 122 based on information provided by clients 140, directs the worker queue 130 in receiving and sending data from and to external sources 160, serves data residing in internal and external user databases 124, 126 to and from clients residing on various devices 140, mediates messaging between two or more clients 140, collects usage data sent by clients 140 and stores it in the usage database 128, and performs algorithmic computations on user data to determine the outcomes of conditional commands and to assess eligibility for sphere membership. The core API manages the synchronization of data between the client and the external services database 126, so that new data written to this database is sent to the client 140 with a minimum of time delay.

The worker queue 130 is a software component that manages the updating and the synchronization of the external services database 126 by directing one or more worker nodes 150 to request data from third party APIs 160. The worker queue may be active whether or not a client 140 is running on a host device. To maximize response time of the client 140, the worker queue 130 and the worker nodes 150 that it directs act as background processes. For example, when a user first signs up to the system and connects an email account from an external provider, the worker queue 130 assigns a worker node 150 to asynchronously retrieve past emails from the external provider either in a single file or in staged downloads, depending on the third party API's particular limitations. In another example, the worker queue may be directed by the core API 110 to assign a worker node 150 to connect to a third party API to update data with the external service 160 that was revised by the user via the client interface 140.

The worker node 150 is a software component that functions independently of the client 140 to manage both read and write operations from and to external data providers 160. Worker nodes may also handle other data computations as assigned by the core API server 110. Worker nodes may be active independently of whether a client 140 is running on a host device. For example, upon logging into the service after a period of time, the worker queue 130 may initiate as many worker nodes 150 as the number of data channels that the user is subscribed to. Each worker node will independently connect to the API of the data channel's corresponding service to check for new data and, when new data is found to be updated or deleted, to write it to the external services database 126.

A client 140 may be configured as a web application, a desktop application, or a mobile application. The client identifies itself to the core API server 110, requests user data corresponding to the unique Urbe ID, stores it in local memory and/or on a local device, and renders it visually on the client device. Since in general all user data cannot be represented in the memory of a given local device at the same time, the client can determine, based on the view of the data selected by the user, what data to request in detail from the server and what data can be requested in part. For example, for a user selecting to view data from the last week on the timeline, data elements outside this time range may be represented in memory by date, sender and recipient only, enabling an icon-based representation on the timeline with minimal delay, should the user switch to another time frame, as further data on the new range is loaded in the background. Multimedia content, in particular, may be represented in compressed form in memory; for example, digital images may be stored as thumbnails and downloaded in their entirely only if specifically requested by the user.

The details of the user interface rendered by the client 140 will be automatically selected by the system as a function of screen size and host device. For example, in larger screens the default interface may be the "timeline view" while the default mobile interface may be the "super-feed" or sphere navigation screen. These views are described in detail below.

While some user data will be delivered to the client 140 by the core API 110 as a result of user actions such as selecting a time frame for viewing, other data may be delivered from the sever to the client independently of user action. For example, if data newly written to the external services database 126 is within the current time range of the timeline, the data may be displayed on the timeline or chat window in real time. This permits real-time applications such as messaging. If the new data is out of viewing range of the timeline, some other suitable indicator may appear on the timeline or in the menu bar indicating the number and type of new unread items that are available for viewing.

In some implementations, data is supplied or newly generated by the user to the system, such as adding a file to the timeline, making an annotation, or sending a message, in which case the flow of information is the reverse of the above, and the client 140 sends the data to the core API server 110 which stores it in the user generated database 124. If the data is shared with other users of the system through a "sphere" then the data may be represented only once in the user generated database 124 to reduce duplication.

Figure 2:
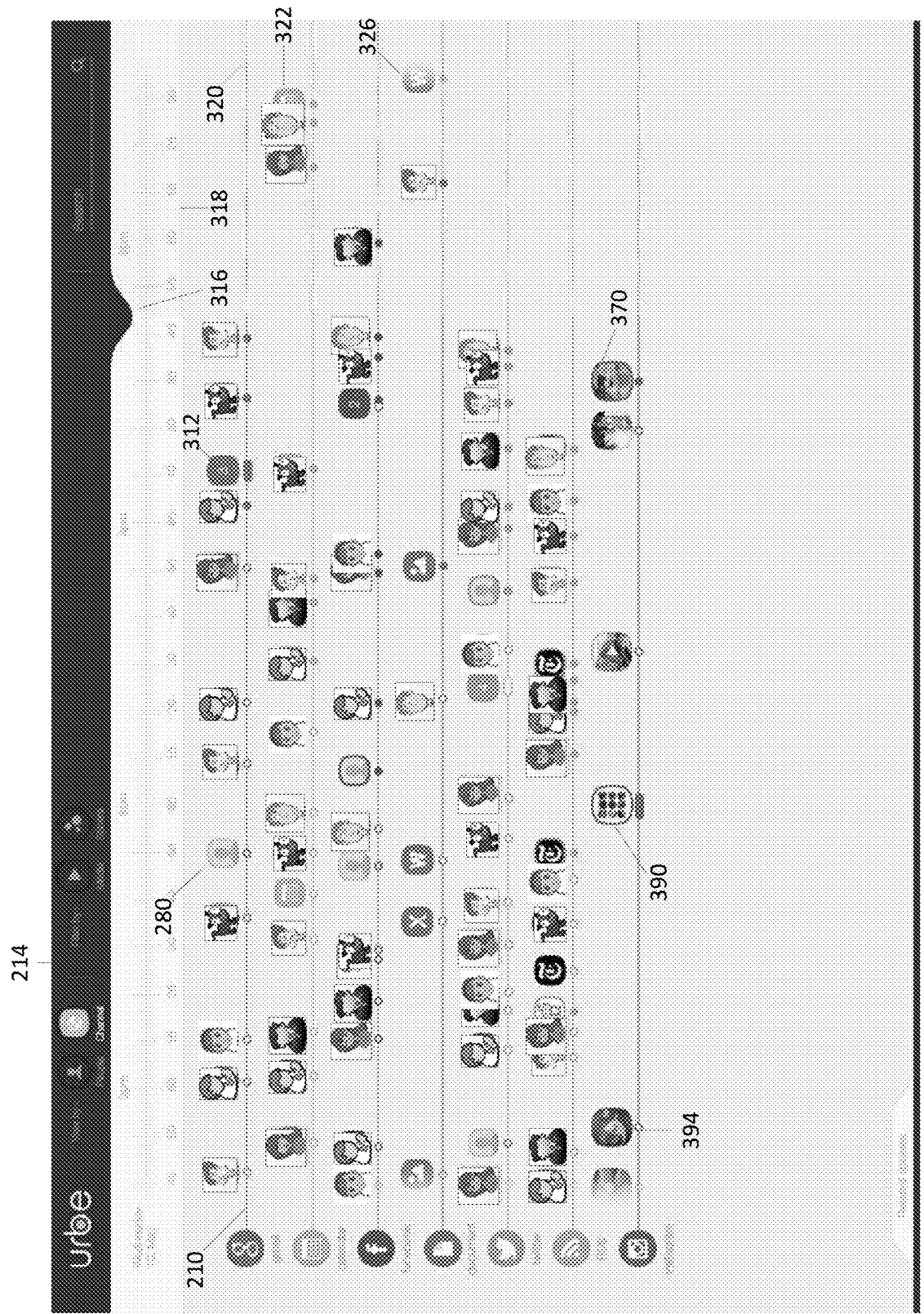
FIG. 2 shows an example screen shot of timelines in "channel view" for high data densities, with origamis fully folded into icons.
Figure 3:
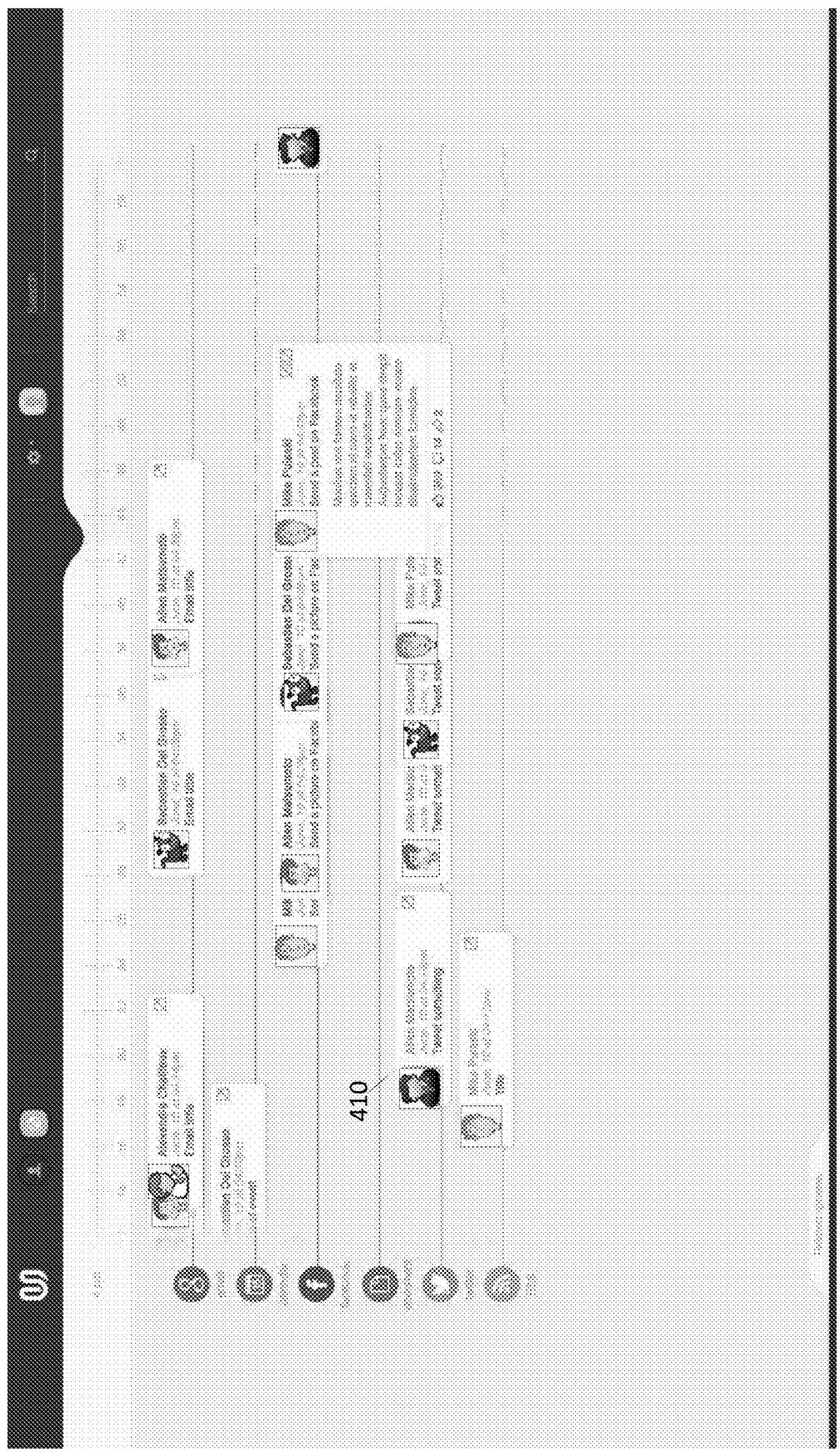
FIG. 3 shows an example screen shot of timelines in "channel view" at lower data density, showing partially unfolded origamis.
Figure 4:
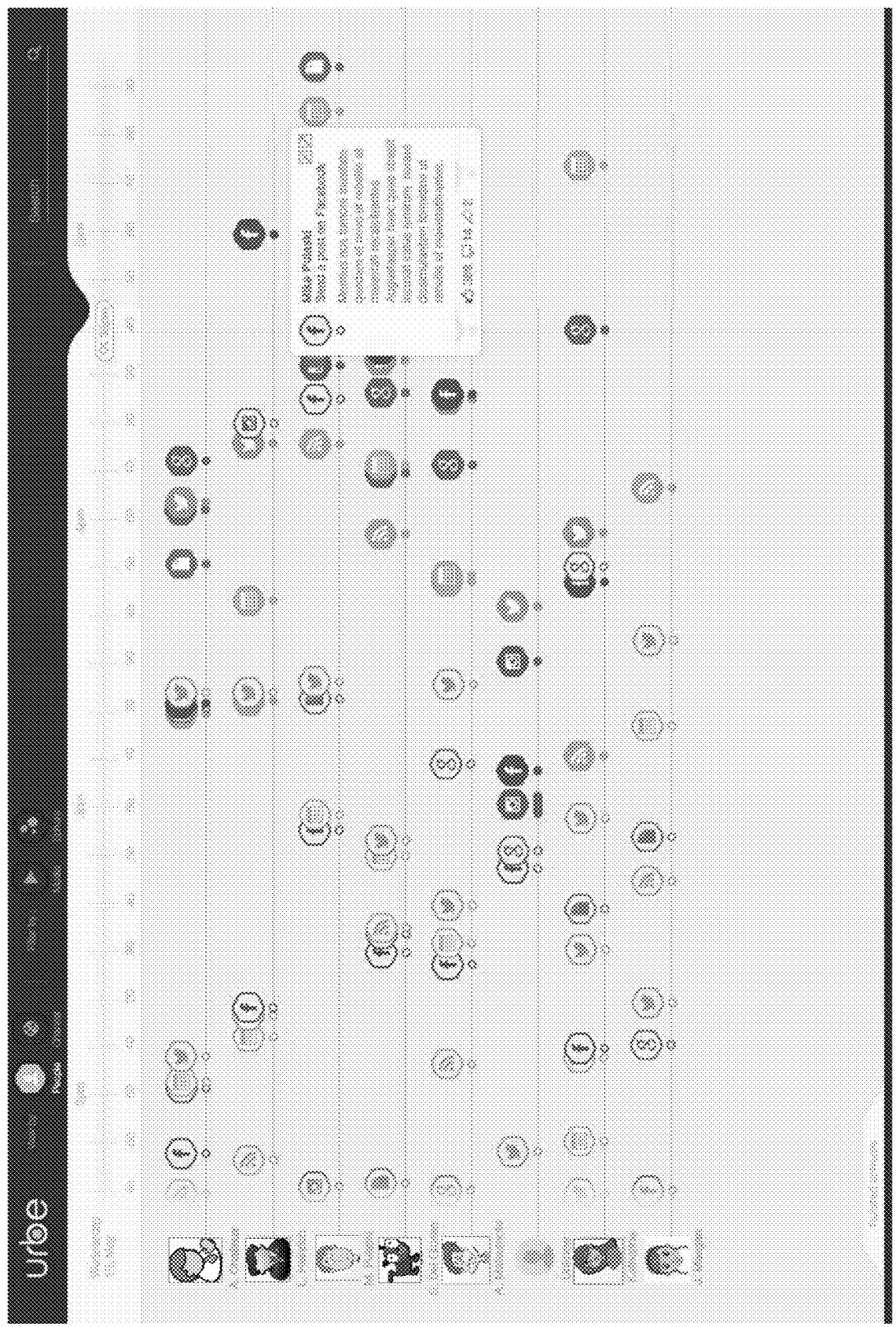
FIG. 4 shows an example screen shot of timelines in "people view".
Figure 5:
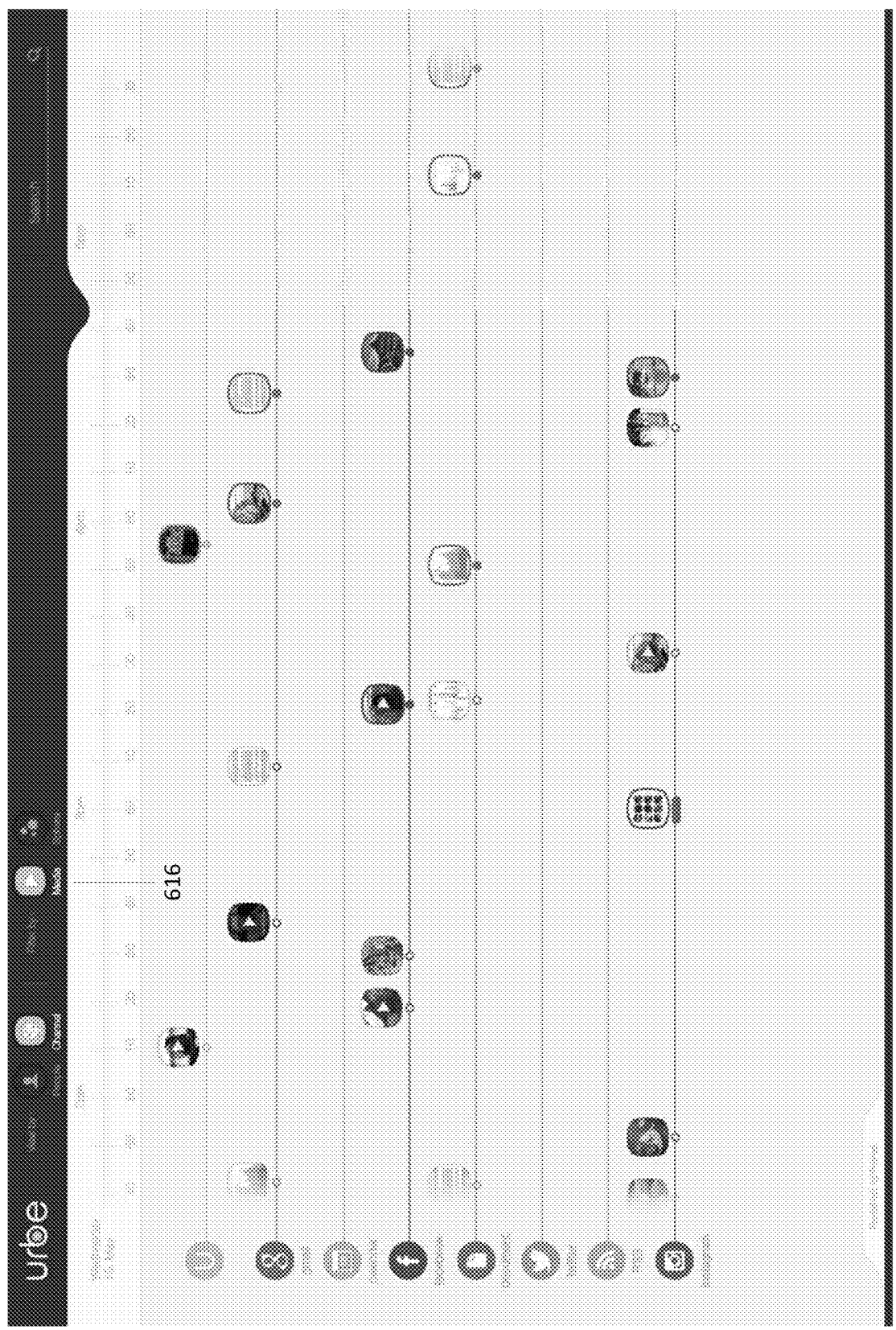
FIG. 5 shows an example screen shot of timelines with a "media filter" engaged.
Figure 6:
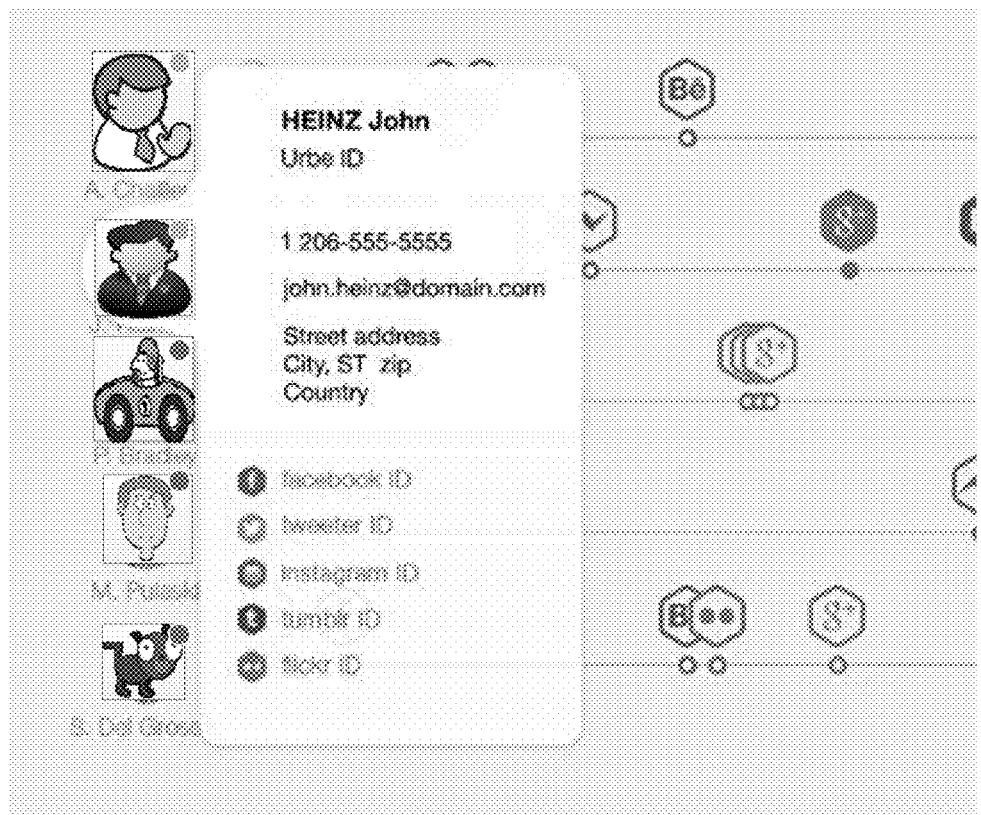
FIG. 6 shows an example "Urbe ID" card.

FIG. 2 shows an example screen shot of the timeline in "channel view" for high data densities (origamis are fully folded into icons). The display of information takes place on a series of parallel timelines preferably spanning the entire width of the screen 210. This view is called "channel view", meaning that each timeline displays content specific to one of potentially many different sources of data, called "data channels", which may be either internal or external to the system. Examples of internal data channels are proprietary messaging, file storage, or annotation services maintained by the system and stored in the user generated database 124. Examples of external data channels are email accounts, cloud file storage, calendar events, instant messaging services, RSS feeds, social networking, weather forecasts, notes and annotations, digital currency transactions, personal quant and other connected data-driven devices, whose source is external to the system, whose data may be accessed by a third-party API maintained by the external service provider, and whose data is stored in the external services database 126.

(Prior to using the system, a sign-up process can be traversed entailing the collection of personal information such as name (used to identify Urbe users to each other; Urbe identities are intended to be "real" and not anonymous) and email, the selection of a unique username (the "Urbe ID", needed for the messaging feature), and authorization granted by the user to allow the system to act on the user's behalf in downloading data from various third party services 160 and saving it in the system's external services database 126.)

Horizontal Features of the Timeline

Items of content from either third-party or native services, referred to below as "data elements" are placed horizontally on the timeline at locations corresponding to the time that the content appeared in its respective data channel (for example, the time of receipt of an email) 312. Alternatively, placement on the timeline can be according to the time of creation of the data element (for example, the time a photo was taken, as opposed to the time it was added to the channel), the time of last update of a file (for example, a spreadsheet that was updated sometime after its creation date), or even an arbitrary time selected by the user (for example, scans of old family photographs from a time many years prior to the creation or modification date of the digital copy). In the latter case, the time coordinate of any item of content in the timeline can be reassigned by, for example, dragging the file and dropping it onto a new location on the timeline, or by manually updating its timestamp via a menu command or within an "origami" view (for which see below).

Time intervals are marked in a timeline situated above the data channel lines and below the menu bar 214. The time interval tick marks may alternatively extend down into the timelines themselves, to enable greater precision in comparing the times of closely spaced data elements. The time intervals expand and contract fluidly and elastically when the user zooms in and out of the timeline (as described below in the section "Navigating the timeline"), maintaining a sense of visual continuity and context. This sense of continuity is further preserved by making the central point of expansion to be the cursor location.

Upon first opening the program on a client computer the initial displayed time range, by which is meant the interval of time spanning the entire screen display, may be typically set by default to a span of a few hours or a few days and will also typically include the present moment in time. The initial time range may be automatically adjusted to include a certain number of data elements on the screen, or it may alternatively be fixed by the user.

There is in principal no minimum or maximum time interval: while typical daily use is envisioned on time intervals from minutes to days, use cases at shorter intervals (for more purely quantitative data types such as, for example, personal heart rate) or longer intervals (for longer term projects such as, for example, creating historical timelines of events) are also envisioned.

The present moment in time is given a distinctive visual representation on the timeline, including but not limited to a combination of features such as: marking with a vertical line; adding a visual feature to the menu bar 316; changing the background color of the timeline at this point 318; and changing the line style of the data channel lines 320. The timeline scrolls to the left with the passage of time at a rate depending on the zoom level, preserving the horizontal position of the present moment. This allows users to continuously and passively monitor incoming messages and data which may be delivered to the client 140 from the core API server 110 in the process of synchronizing data from external services 160 with no need to for the user to directly interact with the system.

Data elements displayed to the right of the present moment ("Now") 322 represent future events, scheduled actions such as sending files or posting messages, predictive data such as weather forecasts, calendar appointments, or other programmable features including conditional actions (for example, to send an email to a certain person at a certain time if certain preconditions are met, or scheduling a transfer of a digital asset or other currency). These features can be accessed by dragging and dropping a data element to a future point on the timeline, clicking on the empty timeline at a future point, or by more traditional means such as menu commands. In the case of calendar events, the calendar can be imported from a third party service as a dedicated data channel on the user's timeline.

As an aid to the eye, the color of the timeline corresponding to each channel may be selected to as to match the principal color of the corresponding service's logo. Icons and/or timelines can fade out at either end of the timeline to better convey the impression of continuation into the past and future 326.

While the above implementation describes the timeline as running horizontally across the screen, the timeline concept can be equally implemented in a vertical mode, where the timeline runs from top to bottom of the screen. While in general the preferred orientation is for the timeline to run along the longest screen axis, the vertical orientation has the advantage that overlapping content may be easier to display and that screen space can be used more efficiently when the direction of text runs perpendicularly to the direction of the timeline. In one implementation, the user interface may automatically switch between timeline view and another view, such as the super-feed, as the screen of a mobile device is tilted by the user.

One implementation where a vertical timeline orientation may be appropriate is a client 140 running on a mobile phone with a vertical screen aspect ratio. For smaller screens, however, the timeline view may not always be the ideal means of displaying timeline information. The mobile environment can complement the desktop environment and its associated timeline view in several ways. 1) It can serve as a more convenient means of communicating with other Urbe users via the messaging channel. 2) It can provide a convenient platform, potentially voice activated, for adding on-the-go annotations or "bread-crumbing". Here, the mobile device becomes central as a journaling device in adding entries such as photos and voice notes directly to users' timelines. 3) In combination with spheres (see below), it can offer an integrated environment (called the "super-feed") for viewing a subset of relevant content present on the user's timeline that cross-cuts the usual user experience of interacting with multiple siloed apps, thus obviating the need for switching between apps to view certain kinds of content. See FIG. 14 for an example of a "super-feed".

Vertical Features of the Timeline

In some implementations, data channels 210 are displayed by default from top to bottom of the screen in rank order of their degree of activity, as computed by the client 140 within the timeframe of the current display. The activity rank of a data channel can be calculated most simply by counting the number of data elements in the channel, although more complex algorithms can be readily devised that weight individual data elements by relevance, including such metrics as number of forwards, comments, likes, file size, and the so forth.

As the time frame is adjusted by zooming or panning, and data elements enter into and exit the field of view, channels may also change vertical position as their activity rank is recalculated and their display order is re-sorted. This process may be smoothly animated so that users can visually track the changes as they are implemented. As different time frames are selected, the full content of data elements corresponding to the new range may be queried in the background from the central API server, to preserve the smoothness of the data rendering and the responsiveness of the client 140.

Users who wish to keep certain data channels at the top of the screen, regardless of changing activity rank as a result of zooming or panning, can "pin" or "unpin" channels as desired, to maintain visual continuity with a subset of channels. "Pinned" channels may be represented by a graphical "pin" mark or other suitable device.

If the number of data channels exceeds the vertical display capacity of the screen, the remaining channels can be viewed through a standard scroll bar or, for touch-sensitive screens, through a "swipe" gesture control.

Proprietary Channels: Messaging, File Storage, and Annotations

Apart from the data channels that users can connect to third party services 160, and whose data is stored in the external services database 126, the system offers to all users three kinds of proprietary channels of its own for use by and between users: 1. messaging, 2. file storage, and 3. annotations. Data from these channels are stored in the user-generated database 124. The data may be displayed in a single, aggregated line in the user's timeline, possibly pinned by default to the top, or it may be expandable into separate lines.

1. Messaging. The messaging channel allows users to send and receive text messages, photos and other media, and potentially digital assets or currencies to and from other users of the system. Its appearance on the timeline is the same as other channels, with messages to and from other users appearing as icons, and with the same user actions as similar data types. Possible recipients of "Urbe" messages are other users of the system who have shared their Urbe ID. A new message can be initiated by clicking on the service icon at the left side of the screen 810 or on any empty portion of the line, whereupon an "Urbe" object will open with relevant messaging options. If actioned within a sphere (see below), the message is broadcast, by default, to all members of the sphere, although the user can choose to limit its distribution. As with other user data, message history is stored by the system in a dedicated database 124.

2. File storage. The file storage channel allows users to store files and to share them with other users. Its display on the timeline is also no different than other channels: files to and from other users appear as icons. New files are added to the channel by dragging and dropping files from other locations [FIG. 10]. Files will appear by default in the channel at a position corresponding to the time they were dropped. As with other user data, files are stored in a dedicated database 124.

3. Annotations. The annotation channel [FIG. 12] allows users to comment on any data elements in their timeline or to create new text annotations. This additional, user-generated content is displayed in its own distinctive, and optionally collapsible, data channel placed above the other channels and directly below the timeline 1310. It may be further distinguished by extra width, to accommodate the display of larger picture elements, and different background color. Annotations are not presented as icons as in other data channels but as partially unfolded origamis; by focusing or selecting the annotation a further unfolding of actions (modify, delete, etc.) takes place. As an aid to the eye, each annotation may optionally be connected by a dotted or other line to the data element that it annotates, if any 1320. The annotation line remains unchanged when switching between channel view and people view.

The purpose of the annotation line is to allow users to produce a curated subset of data elements in order to surface higher-value content at larger time frames. It can be used as a diary or journal of commentary linked to content below, as well as stand-alone entries. When zooming to higher time elevations, higher value elements (whose value can be assigned automatically or by user preference) preferentially remain displayed in the annotation line, thus creating a sense of different story elements in a life narrative being highlighted at different zoom levels.

Navigating the Timeline

Intuitive navigation through time, including the principal actions of zooming to higher and lower time elevations (a high elevation being defined as a long time interval and a low elevation being defined as a short interval), panning to earlier and later time periods, and jumping to particular points in time, is key to successful user experience and to the usefulness and attractiveness of the interface. The means of user input depends on the type of device on which the system is operating. For touch screens this may comprise contextual "swipe" and "pinch" gestures to pan and zoom, and for static screens, mouse click wheel rotation combined with keyboard input such as the "shift" or "control" key, the arrow keys, or other designated keyboard shortcut. Jumping to a particular point in time may be facilitated through a drop-down menu command, or in the case of jumping to special times such as the present moment, via a dedicated button on the menu bar. The responsiveness of the navigation and the smoothness of the timeline animation is facilitated by ensuring that the client 140 runs the rendering engine and data communication as separate, asynchronous processes.

Representation of Content on Timeline

Initially, the data elements displayed on the screen are received from the core API sever 110, which in turn has received the data from the central database 120.

Content is added dynamically to the timeline as new items are delivered by the worker nodes 130 to the external services database 126 and then back to the client 140, whether web, desktop or mobile, through the core API server 110. Worker nodes are assigned to periodically check each channel service for new content (in a "pull" configuration) or to receive new content at regular intervals (in a "push" configuration), depending on the specific settings and limitations of the relevant third party API or other method of data retrieval.

At higher screen data densities, data elements are visually represented on the timeline in the form of icons 312. Icons are shorthand on-screen representations of data elements of varying type. They make the most of limited screen space by maximizing the number of data elements that can be displayed at the same time, and increase the efficiency of browsing and interacting with content across, potentially, many different third-party services in addition to content generated and maintained by Urbe. Icons also increase the visibility and contextuality of chronological relationships between data elements which may be difficult to see by other means.

Visually, icons may consist primarily of a thumbnail image of the sender 312 or of an image contained in the data element 370, or if no image is available, a generic icon may be assigned 280. For icons representing file types, such as documents and spreadsheets, the logo for the associated service may be shown instead. If multiple images are contained in the data element, they may be represented by a grid of smaller thumbnail images 390, or, alternately, by either a row containing miniature thumbnails of the most frequent contributors within the bundle, or by a horizontally stacked series of images tilted into an imaginary third dimension. The icon shape may be circular, or a rounded square, or other suitable shape. Their size may be standardized across all icons displayed on the timeline, or alternatively they may be displayed as some function of the file size of the underlying data that they represent.

Icons are placed on top of the timeline centered on their timestamp location, or, preferably, just above the timeline 312. In the latter case, a dot associated with the icon 394 but possibly separated by one or more pixels, or a short line segment or other indicator, marks more precisely the time and removes some ambiguity if the icons are partially overlapping.

When data elements such as emails or messages have an "unread" status, it is helpful to indicate this status to the user on the timeline display by highlighting unread data elements. This can be done by, for example, adding a solid outline around the icon and/or by filling the associated dot on the timeline 395. Where appropriate the change of status from "unread" to "read" is relayed back to the core API server 110 and thence to the provider of the third-party service 160, so that the "read" status of the data element can be consistently updated across all devices and applications.

When two or more data elements in a given channel are close together in time, such that their icons would be entirely or partially overlapping when displayed on the screen at a given time elevation, as determined by an overlap threshold criterion, the group of overlapping icons can be optionally replaced by a single generic icon displaying the number of bundled icons that it represents 920. The associated dots on the timeline can be replaced by a line segment spanning the time period occupied by the overlapping data elements 930. The line segment itself can contain filled or open portions, conveying information about the "read" status of the respective data elements it contains 932. These icon representations of bundled data elements, which act to reduce screen clutter, can be programmed to automatically unbundle and re-bundle as the user zooms in and out to lower and higher time elevations and crosses the overlap threshold that triggers the bundling event.

When the data elements delivered to certain channels contain purely quantitative data, they may require different screen display strategies. Examples of such data include personal health data such as weight, blood pressure, heart rate, and physical fitness activity, as well as data produced by internet-connected devices. Such data may be represented in icon format as described above, or it may be plotted in various ways, such as by a line or bar graph, to show continuity between data elements 1410.

Figure 15:
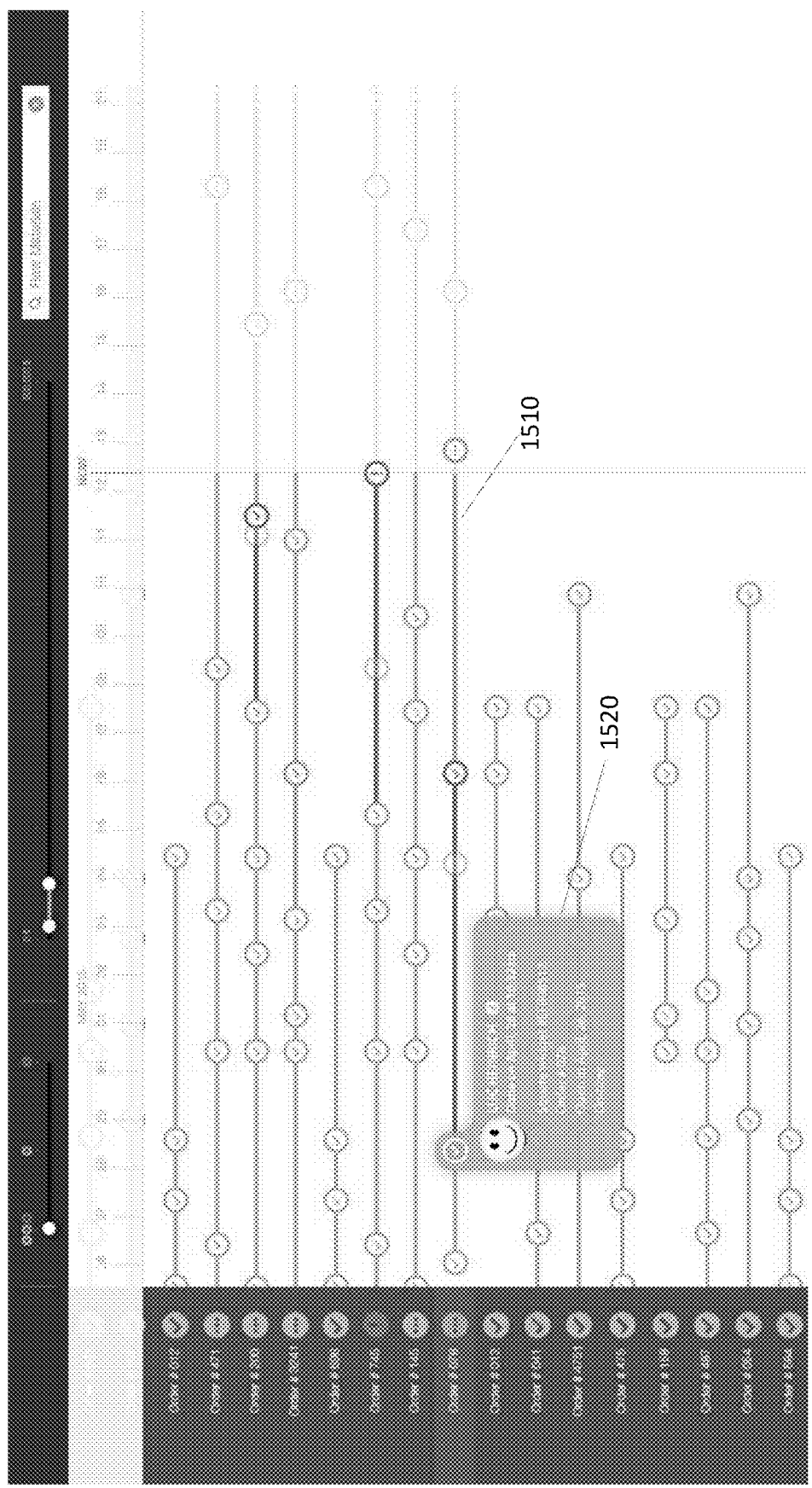
FIG. 15 shows an alternative representation of data on timelines, where data elements comprise multiple connected steps in time sequence.

Still other data elements, specific to specialized domains, may represent a sequence of actions over time, such as a procurement process [FIG. 15]. In such cases its representation on the timeline may be extended to include the time span of the process, and may include various intermediate stages 16101510. Both the stages and the line segments connecting them may be formatted to visually convey information about the stage; for example, a red or yellow line indicating a missed deadline 16101510. The stages themselves may contain information on a particular stage and function as an "origami" 1620 1520 (see below).

Origamis

While icons provide a shorthand means of contextualizing in time a large number of data elements of different origin and type, users also want to access and interact with the underlying data that they represent, without the discontinuity of switching to another application to experience the content of the underlying object. This is done by turning icons into dynamic objects that can "unfold" to varying degrees, either automatically based on the number density of icons within a given timeline view, or manually based on user input. We call the data element in its various stages of "folding" and "unfolding" an "origami".

The icon, described in the section above, is the fully "folded" version of an origami. When the density of information on the screen is above a certain threshold, data elements are displayed by default as icons. At lower densities, origamis may automatically "unfold" to a degree, displaying minimal information such as sender, subject line, and first line of text 410. More efficient stacking of origamis may be attained by tilting them into an imaginary third dimension; the angle of the tilt may be a function of the density of origamis to be displayed. At still lower densities the origami may automatically "unfold" further, displaying more content and features depending on the limits of the device's screen size and resolution [See FIG. 11 for example of stages in unfolding]. Origamis may also unfold all at once or in stages by user actions such as hovering the mouse pointer over the icon or by a mouse click or touch.

Additional features of "unfolded" origamis may include a menu bar of actions such as reply, forward, comment, like, modify, rename, delete, edit, and the like 1210. Deleting, renaming or otherwise modifying an origami representing a data element originating from a third party will trigger a request, through the core API server 110, to the third party API 160 so that the same information can be updated across all devices and displays.

More fully "unfolded" origamis may also include the contents of other origamis, such as previous emails or messages in a chain of correspondence, displayed above or below in a single vertically scrolling window similar to the "chat window" commonly found in other messaging applications. The relationship to other data elements can be further emphasized on-screen by brightening or otherwise highlighting the icons of the related data elements if they already appear in the time interval represented on the timeline. The impression of focus on a group of related elements can be optionally further enhanced by dimming or reducing the contrast of unrelated icons and other graphical elements on the timeline.

The location of an origami may be pegged strictly to the horizontal and vertical position of its fully "folded" icon, or, alternatively, its screen location can be relaxed to better utilize screen space while preserving its chronological order in relation to other data elements.

Menu Bar: Time Hops, Views and Filters

A menu bar at the top of the screen above the timeline contains, apart from the product logo, settings menu, or other administrative elements, commands allowing further control of the display of data elements on the timelines. These commands can be broadly classified into three categories: 1. Time hops, 2. Views, and 3. Filters. The categories are not mutually exclusive: so, for example, one can activate a view and a filter simultaneously. Changes of view are computed and rendered on the client side 140.

1. Time hops. A time hop control may include, for example, a button that sets the time frame to a "home view" which may include the present moment towards the right hand side of the screen. A smooth animation panning and zooming the display from the previous time frame to the new time frame is key to maintaining a sense of continuity and location during the time hop. Time hops complement the "zooming" and "panning" navigation controls described above.

2. Views. A change of view, by contrast, retains the current time frame but redefines the timelines and thus the data elements that appear on them, without, however adding or removing data elements to the view. As with navigation buttons, view controls may also be represented by a button or toggle switch 912. The default view, already described above, is called "channel view". In this view, each timeline represents content of a particular type imported from a third party service or native to the system, while data elements on each line may have originated from different people.

Users may find it more convenient, for certain use cases, to switch to a view where each timeline represents a different person rather than a different service. In "people view" [FIG. 4], data elements on each line are generated by the same Urbe user I.D. but may have originated from different third party services. Each user will also have his or her own dedicated "person line", containing his or her own content; this line may be pinned by default to the top of the timeline. Content originating from the user and directed to another person, such as an email, will appear in the user's own line by default; such outgoing data elements may be marked visually to distinguish it from other items of content.

"People view" is made possible by a previous computational step, specific to the system, of linking across different services the identities of individuals with whom the user interacts and associating each identity with a unique Urbe user I.D. chosen by the user when first signing on to the system. This data is stored in the User I.D. database 122. For example, there is no way for the system to know in advance that a certain email, text message, and blog post originate from the same person and should be displayed together on one line. The computational step of identity aggregation and linking can take place either manually, possibly assisted by a partially automated process that groups together similar user names, or, preferably, by the Urbe accounts of other users of the system, each of whom has been assigned a unique "identity card" by the system, the details of which are accessible only internally to the system for the purposes of unifying the identity of users when cross-platform content specific to them is viewed by other users. It follows that individual user accounts do not operate entirely parallel from each other, from the standpoint of the core API server 110, and that the more people connected to a given user are also users of the system, the better this particular feature will function.

Other views besides "channel view" and "people view" can be envisioned: for example, viewing by file size, or geographical region, or other quantifiable characteristic of the data possessed by each data element. Each view with its associated timelines can be modeled as a complete, orthogonal coordinate system: it is complete in that every data element is represented in the view; it is orthogonal in that no data element appears on more than one timeline. Switching from one view to another can thus be modeled as a transformation of coordinate axes. In the coordinate transformation no data element is added to or removed from any view; the data elements simply shift from one line to another as the lines themselves are redefined. Given limitations in screen space, however, not all lines will be visible at the same time, and so data elements may shift on or off screen and be visible only when scrolling through the other lines.

3. Filters. A filter, in contrast to both of the above, retains the definition of the timelines while reducing screen clutter by hiding from view a subset of the data elements, such that the remaining data elements retain a useful contextual link to each other. In its most basic incarnation, a search is a kind of filter. For example, the user can type a name or a word into the search box in the menu bar, and with each keystroke the data elements that fail to match the search criteria are removed from the screen. Another simple filter removes data elements based on some other criteria such as data type: for example, a "filter by media" button 616 can remove all data elements that do not contain either a photo, video or audio clip, and turn the remaining icons into thumbnails [See FIG. 5 for an example result].

An Example Computing System

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For brevity, the disclosure may use the phrase "display a data object" (or similar phrases) to mean "display a graphic item representing the data object"

The block diagram of FIG. 16 shows a non-limiting example of a user interface 1600 for displaying data packages on timelines. Although the diagram of FIG. 16 shows four widgets 1602-1608 and three timelines 1610a-1610c, a user interface 1600 may include any suitable number of widgets (e.g., one, two, three, four, five or more, etc.) and/or any suitable number of timelines (e.g., one, two, three, four or more, etc.). Also, the number of timelines displayed may depend on the specified data package(s), the specified view, or other parameters. For example, in some views (e.g., user view), one timeline may be displayed for each user who has contributed content in the data package, and in other views (e.g., channel view), one timeline may be displayed for each data channel through which content in the data package was provided.

Some embodiments have been described in which the user interface arranges the timelines such that the portions of the timelines that are displayed simultaneously all represent the same time period. In some embodiments, navigation of the time periods corresponding to the displayed portion of each timeline is decoupled, such that the portions of the timelines that are displayed simultaneously can represent different time periods.

In some embodiments, the JavaScript library React.js is used to render the user interface quickly and smoothly Terminology The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method comprising:
   selecting a data package wherein the data package identifies a plurality of data objects, wherein each data object includes a tag representing a time and an attribute value indicating a data channel;
   generating a first mapping between two or more data channels and two or more timelines, wherein the first mapping associates each data channel with a respective timeline, and wherein the first mapping corresponds to a first view of the data package;
   assigning the data objects to the timelines based on the first mapping and on the attribute values of the data objects indicating the data channels of the data objects, such that the data channel associated with each respective timeline matches the indicated data channel of the data objects assigned to that respective timeline;
   displaying, via a user interface, a first portion of the first view of the data package, including
      displaying first portions of the timelines, wherein the displayed first portion of each timeline represents a first time period, and
      displaying first graphic items arranged on the first portions of the timelines, wherein each first graphic item displayed on each respective timeline represents one or more of the data objects assigned to that respective timeline and tagged with respective times within the first time period; and
   generating a second mapping between two or more users and the timelines, wherein the second mapping associates each user with a respective timeline, and wherein the second mapping corresponds to a second view of the data package.

2. The method of claim 1, further comprising:
   receiving, via a user interface component, user input indicative of scrolling the timelines to a second time period;
   in response to the user input, displaying a second portion of the first view, including
      displaying second portions of the timelines representing the second time period, and
      displaying second graphic items arranged on the second portions of the timelines, wherein each second graphic item on each respective timeline represents one or more of the data objects assigned to that respective timeline and tagged with respective times within the second time period.

3. The method of claim 1, further comprising:
   receiving, via a user interface component, user input indicative of zooming the timelines to a second time period within the first time period;
   in response to the user input, displaying a second portion of the first view, including
      displaying second portions of the timelines representing the second time period, and
      displaying second graphic items arranged on the timelines, wherein each second graphic item displayed on each respective timeline represents one or more of the data objects assigned to that respective timeline and tagged with respective times within the second time period.

4. The method of claim 3, wherein the timelines include a first timeline, wherein the first graphic items include a cluster-type graphic item on the first portion of the first timeline, and wherein the cluster-type graphic item represents two or more particular data objects.

5. The method of claim 4, wherein the second graphic items include two or more graphic items on the second portion of the first timeline, and wherein each of the two or more graphic items represents a different subset of the two or more particular data objects.

6. The method of claim 5, wherein displaying the second portion of the first view further comprises making a determination to assign the subsets of the two or more particular data objects to the two or more graphic items, and wherein the determination is based, at least in part, on (1) the times with which the two or more particular data objects are tagged, (2) a duration of the second time period, (3) a total number of data objects to be represented on the second portion of the first timeline, (4) sizes of the subsets of the two or more particular data objects, (5) a length of the second portion of the first timeline when displayed on a display device, or (6) any combination thereof.

7. The method of claim 1, further comprising:
receiving, via a user interface component, user input indicative of zooming the timelines to a second time period encompassing the first time period;
in response to the user input, displaying a second portion of the first view, including
displaying second portions of the timelines representing the second time period, and
displaying second graphic items arranged on the timelines, wherein each second graphic item displayed on each respective timeline represents one or more of the data objects assigned to that respective timeline and tagged with respective times within the second time period.

8. The method of claim 1, wherein the first graphic items include a particular graphic item on the first portion of the first timeline, wherein the particular graphic item represents first data obtained from a particular application, and wherein the method further comprises:
identifying user input indicating selection of a particular portion of the particular graphic item, and in response thereto, navigating to the first data within the particular application.

9. The method of claim 1, wherein the data package is a first data package, wherein the first graphic items include a particular graphic item on the first portion of a particular timeline, wherein the particular graphic item includes one or more links to one or more second data packages, and further comprising:
identifying user input indicating user selection of a particular link to a particular second data package; and
in response thereto, displaying a portion of a view of the particular second data package, wherein the portion of the view of the particular second data package comprises respective portions of two or more timelines representing the first time period.

10. The method of claim 1, further comprising identifying one or more search criteria, wherein each of the data objects represented by the first graphic items satisfies the one or more search criteria.

11. The method of claim 1, wherein each data channel is a data communication channel, and wherein the attribute value of each data object indicates the data communication channel through which data represented by the data object were transmitted.

12. The method of claim 11, wherein the timelines include first, second, and third timelines, wherein the data communication channels include a social networking platform, a social media platform, and a messaging platform, and wherein the first mapping associates (1) the first timeline with the social networking platform, (2) the second timeline with the social media platform, and (3) the third timeline with the messaging platform.

13. The method of claim 1, further comprising ranking the timelines based on one or more ranking criteria, wherein the first portions of the timelines are displayed in an order corresponding to the ranking of the timelines.

14. The method of claim 1, wherein the data objects in the plurality of data objects comprise payload data corresponding to text, images, videos, documents, spreadsheets, and/or files.

15. The method of claim 1, wherein the data objects in the plurality of data objects comprise payload data corresponding to text messages, emails, instant messages, source code files, social network posts, and/or micro blog messages.

16. The method of claim 1, wherein the first time period includes a present time, and displaying the first portion of the first view of the data package further includes displaying graphical indicia of the present time.

17. The method of claim 16, wherein a particular one of the first graphic items is tagged with a time after the present time, and wherein the particular first graphic item represents a data object corresponding to a prediction, a schedule event, or a conditional action.

18. A system including:
one or more data processing devices;
one or more storage devices storing instructions that, when executed by the data processing devices, cause the data processing devices to perform operations including:
selecting a data package wherein the data package identifies a plurality of data objects, wherein each data object includes a tag representing a time and an attribute value indicating a data channel;
generating a first mapping between two or more data channels and two or more timelines, wherein the first mapping associates each data channel with a respective timeline, and wherein the first mapping corresponds to a first view of the data package;
assigning the data objects to the timelines based on the first mapping and on the attribute values of the data objects indicating the data channels of the data objects, such that the data channel associated with each respective timeline matches the indicated data channel of the data objects assigned to that respective timeline;
displaying, via a user interface, a first portion of the first view of the data package, including
displaying first portions of the timelines, wherein the displayed first portion of each timeline represents a first time period, and
displaying first graphic items arranged on the first portions of the timelines, wherein each first graphic item displayed on each respective timeline represents one or more of the data objects assigned to that respective timeline and tagged with respective times within the first time period;
and generating a second mapping between two or more users and the timelines, wherein the second mapping associates each user with a respective timeline, and wherein the second mapping corresponds to a second view of the data package.

19. A non-transitory computer storage medium having instructions stored thereon that, when executed by a data processing apparatus, cause the data processing apparatus to perform operations comprising:
selecting a data package wherein the data package identifies a plurality of data objects, wherein each data object includes a tag representing a time and an attribute value indicating a data channel;
generating a first mapping between two or more data channels and two or more timelines, wherein the first mapping associates each data channel with a respective timeline, and wherein the first mapping corresponds to a first view of the data package;
assigning the data objects to the timelines based on the first mapping and on the attribute values of the data objects indicating the data channels of the data objects, such that the data channel associated with each respective timeline matches the indicated data channel of the data objects assigned to that respective timeline;

displaying, via a user interface, a first portion of the first view of the data package, including displaying first portions of the timelines, wherein the displayed first portion of each timeline represents a first time period, and displaying first graphic items arranged on the first portions of the timelines, wherein each first graphic item displayed on each respective timeline represents one or more of the data objects assigned to that respective timeline and tagged with respective times within the first time period; and generating a second mapping between two or more users and the timelines, wherein the second mapping associates each user with a respective timeline, and wherein the second mapping corresponds to a second view of the data package.

\* \* \* \* \*